United States Patent [19]

Spero et al.

[11] Patent Number: 5,072,218

[45] Date of Patent: Dec. 10, 1991

[54] CONTACT-ANALOG HEADUP DISPLAY METHOD AND APPARATUS

[76] Inventors: Robert E. Spero, 201B South Trail, Strantford, Conn. 06497; Bruce E. Hamilton, 28088 Wildwind Rd., Canyon Country, Calif. 91531; Howard P. Harper, 325 Navajo Loop, Huntington, Conn. 06484; Thomas E. Wright, 36 Putting Green La., Prospect, Conn. 06712; Lorren Stiles, 12 Old Roxbury Rd., Roxbury, Conn. 06783; Robert C. Kass, 329 Greens Farms Rd.; James J. Licari, 1334 Sturges Hwy., both of Westport, Conn. 06880

[21] Appl. No.: 160,222

[22] Filed: Feb. 24, 1988

[51] Int. Cl.$^5$ .............................................. G01C 21/00
[52] U.S. Cl. .................................... 340/980; 340/705; 364/444; 359/630
[58] Field of Search ............... 340/971, 980, 705, 721; 350/174; 434/44; 73/178 R; 358/103, 250; 364/432, 439, 441, 443, 444, 448, 457, 460, 462

[56] References Cited

U.S. PATENT DOCUMENTS

| Re. 28,847 | 6/1976 | Vizenor. | |
|---|---|---|---|
| 3,923,370 | 12/1975 | Mostrom. | |
| 4,181,405 | 1/1980 | Cohen | 340/980 |
| 4,305,057 | 12/1981 | Rolston. | |
| 4,368,517 | 1/1983 | Lovering. | |
| 4,439,755 | 3/1984 | LaRussa | 340/980 |
| 4,465,347 | 8/1984 | Task et al. | 350/174 |
| 4,761,056 | 8/1988 | Evans et al. | 350/174 |

FOREIGN PATENT DOCUMENTS 2819761 11/1978 Fed. Rep. of Germany ...... 340/980

OTHER PUBLICATIONS

"New Cockpits Use Integrated Electronics", appearing in Aviation Week & Space Technology, p. 148, dated 1/16/84.
"LHX Design Proposals Spur Investment in Simulation Facilities", appearing in Aviation Week & Space Technology, pp. 153-160, dated 1/14/85.
"LHX Takes Shape", appearing in Defense Electronics, pp. 62-68, dated 10/85.
"Boeing and Sikorsky Form LHX Program Office", appearing in Aviation Week & Space Technology, p. 25, date 10/21/85.
"ARTI Researchers Assess Feasibility of Varied Single-Pilot Operations", appearing in Aviation Week & Space Technology, p. 61, dated 1/19/87.
"Helicopters The Way Ahead", appearing in Interavia Aerospace Review, p. 27, dated 1/86.
"Shadow", appearing in Defense Industry Report, p. 253, dated 6/2/86.
Virginia Biggins, "Double-Cockpit Copter Tests Single-Pilot Flight", appearing in Daily Press, p. B2, dated 11/19/88.
"Flying Shadow", appearing in The Times-Herald, p. B2, dated 11/20/86.
"Shadow Research", appearing in Interavia Air Letter, p. 5, dated 11/24/86.
"Light Helicopter Family (LHX) Program Overview", appearing in Vertiflite, pp. 10-11, dated Nov./Dec. 1987.

(List continued on next page.)

Primary Examiner—Donnie L. Crosland
Assistant Examiner—Brent A. Swarthout
Attorney, Agent, or Firm—Francis J. Maguire, Jr.

[57] ABSTRACT

Images are provided to a pilot in an aircraft overflying the earth by means of a helmet mounted display system. The position and attitude of the aircraft with respect to the earth and the attitude of the helmet with respect to the aircraft are monitored in order to convert a plurality of stored earth position signals into helmet coordinates. Earth points which are viewable by the pilot are displayed using symbolic images thereof such that the symbolic images coincide, from the pilot's point of view, with the actual positions of the viewable points on the earth.

3 Claims, 9 Drawing Sheets

OTHER PUBLICATIONS

J. W. Groulx, "Advanced Attack Helicopter (YAH-64) Status Report", Source Unknown, predates Dec. 1981.

Section 4-28 of TM 55-1520-238-10, the Apache (AH-64A), "Helicopter Operator's Technical Manual", dated 6/28/84.

"Virtual Cockpit's Panoramic Displays Afford Advanced Mission Capabilities", appearing in Aviation Week & Space Technology, pp. 143-152, dated 1/14/85.

"Army Aviation Chief Cites Need for Improved Battle Avionics", appearing in Aviation Week & Space Technology, pp. 118-123, dated 6/16/86.

"Helmet Gives Graphic Picture", appearing in ElectronicsWeek, p. 34, dated 4/1/85.

"Advanced Cockpit Development Effort Signals Wide Industry Involvement", appearing in Aviation Week &. Space Technology, pp. 72-77, dated 4/20/87.

Handout, Contractor Review Meeting, Air Force Aerospace Medical Research Laboratory, 1985.

The Use of a Virtual Cockpit in a Simulated Helicopter Attach Mission (Preliminary Observations), by Wayne L. Martin, AFAMRL-TP-85-301, dated Feb. 1985.

Projective Application of the Subjective Workload Assessment Technique to Advanced Helicopter Crew System Designs, by Gilbert G. Kuperman, AFAMRL-TR-85-014, dated Feb. 1985.

CONTACT-ANALOG HEADUP DISPLAY METHOD AND APPARATUS

The government has rights in this invention pursuant to contract DAAK51-84-C-0007 awarded by the Department of the Army.

CROSS REFERENCE TO RELATED APPLICATIONS

The invention described herein may employ some of the teachings disclosed and claimed in commonly owned copending applications filed on even date herewith by Harper eta l, (Ser. No. 07/160,220, now abandoned, entitled AIRCRAFT WAYPOINT DISPLAY SYMBOLOGY; by Kass et al (Ser. No. 07/160,466) entitled AIRCRAFT ALTITUDE DISPLAY SYMBOLOGY; by Stiles et al, Ser. No. 07/160,556, now abandoned, entitled AIRCRAFT TORQUE DISPLAY SYMBOLOGY; by Hamilton et al, Ser. No. 07/160,221 entitled AIRCRAFT VELOCITY/ACCELERATION DISPLAY SYMBOLOGY; and by Harper et al, Ser. No. 07/160,059, now abandoned, entitled AIRCRAFT HELMET POINTING ANGLE DISPLAY SYMBOLOGY.

TECHNICAL FIELD

The present invention relates to aircraft displays and, more particularly, to a helmet related display method for a pilot in an aircraft.

BACKGROUND ART

As a consequence of the complexity of aircraft instrumentation systems, pilots are burdened with a significant amount of monitoring activities, even during normal operations. To this end, the pilot frequently needs to lower his head to obtain flight information from the cockpit instruments. Such information will typically include many discrete bits of data which need to be checked repeatedly. These include, for example, torque, altitude, heading, attitude and a vast array of other similar pieces of information. One of the more burdensome tasks which a pilot is oftentimes required to accomplish is to fly the aircraft along a preselected flight path having various waypoints or flight plan benchmarks mapped out along the preselected route. This task requires consulting various cockpit instruments and maps and comparing the present aircraft position with what is shown on the map and with what may be seen outside of the cockpit windscreen. Flight directors have been developed to ease this burden. However, for flying in a nap-of-the-earth mode, the pilot cannot afford to divert his attention to any in-cockpit instrument, lest he be surprised by an unexpected obstacle or threat in his path.

Electro-optical equipment has been developed to at least in part reduce the frequency of the need to look down by superimposing symbolic flight information similar to what appears on the instrument panel into the pilot's field of vision. The images are typically presented to the pilot's eye by means of collimated light rays so that the symbology appears to be at optical infinity and the pilot need not accommodate to view the individual symbols. Thus, the pilot views the real world before him focused at infinity while, at the same time, he sees the symbols, also at infinity. The superimposition of the two images, i.e., the real world and the electronically generated symbology, enable the pilot simultaneously to assimilate pictorial information from the outside world and informational symbology without having to look inside the cockpit nearly as frequently. However, complex tasks such as staying on a flight plan may still require map consultation and consume large amounts of time.

The first generation headup displays consisted of a cathode ray tube (CRT) with appropriate optical elements mounted in the aircraft's instrument panel. The CRT generated an image which was provided onto a combining mirror for viewing by the pilot. Selection of collimating optical elements between the CRT and the combining mirror caused the projected images to appear as if at infinity. In spite of the obvious advantages, the first generation headup displays had three major problems. First, the displayed information was stationary with respect to an axis, usually aligned along the longitudinal axis of the aircraft. Second, large amounts of scarce instrument panel space was required for the large and bulky CRT. Third, the images were presented within a limited field of view.

A second generation headup display was developed for helmet mounting of the CRT and optics See, e.g., U.S. Pat. No. 3,923,370, granted to Mostrom, at column 4, line 58 to column 5, line 42. Unfortunately, such CRTs were necessarily small in size, were necessarily operated at safe voltages that were less than optimal for brightness purposes and generally produced dim images with poor resolution. Despite the small size, heat and weight problems associated with the CRT contributed to pilot fatigue. The optics in the various second generation headup displays varied widely in attempts to find the best way to generate and project symbology images in the form of collimated rays into the eyes of the pilot. See again U.S. Pat. No. 3,923,370, column 5, lines 1–42. See also, for example, U.S. Pat. No. Re 28,847, reissued to Vizenor, at column 3, lines 58–65, column 4, line 52 through column 5, line 3.

A third generation of helmet mounted headup displays was developed to provide a more efficient design. The CRT was removed from the helmet and placed in a noncritical portion of the cockpit with an optical fiber bundle coupling the CRT with the pilot's visual faculties. See U.S. Pat. 4,439,755 to LaRussa, column 3, lines 1–5. See also column 1, lines 14–15 where "enhanced or computer-processed data base images of the terrain" are mentioned and column 2, lines 20–31 where helmet monitoring is suggested for target acquisition purposes. Still another third generation approach is described in copending application U.S. Ser. No. 079,553 entitled "Method and Apparatus for Mounting a Cathode Ray Tube for a Heads-Up Display System" filed by Smith on July 30, 1987 and owned by the assignee hereof.

Thus, a headup display system will typically include an image source such as a CRT which provides images of various symbols for the representation of information generated by an electronic computer. From the image source, the light rays travel through an optical system of one sort or another onto a combining element situated in the pilot's field of vision either on a helmet or interposed between the pilot's head and the front of the wind screen, which element transmits real world images and reflects symbology images by means of collimated light into his eyes.

Depending on the flight mode, the pilot can typically select various operating modes of the display system so that only those graphics, symbols and alphanumerics needed in each mode are displayed, such as, e.g., landing, weapon release and navigation. The symbology used has not been standardized in the industry because improved displays are continually being developed.

A general display mode might include indications of airspeed, altitude, angle of attack, vertical speed, heading, cross-track distance, artificial horizon, a flight director (indicating, together with the artificial horizon and the instantaneous flight attitude, the course corrections needed to stay on a preselected flight plan), pitch (by means of, e.g., a separate pitch ladder) and a separate roll angle indication. See, for example, U.S. Pat. 4,305,057 to Rolston in which a headup display provides a forward looking view along the longitudinal axis of the aircraft to the pilot as if the aircraft were gimballed inside and at the center of a transparent sphere which has heading and pitch angles marked on its surface.

For a military aircraft, an air-to-ground display mode for weapons delivery correction might be selected in preparation for the more accurate destruction of an impending target. A waypoint, within view on the way to the target, might be identified on a map and would have its coordinates manually entered by the pilot into the navigation system. The pilot would then manually align a marker on a headup display into coincidence with the actual waypoint and a more precise fix may then be made on the position of the aircraft with respect to the waypoint and ultimately, the target. Various air-to-air modes are also known in the art of military headup displays including computed lead angle mode (to directly enable positioning the aircraft in the best possible firing position) and trajectory mode (taking into account the laws of ballistics as well as the aircraft's speed to compute the shell trace which would result if the guns were fired [the pilot can also obtain a lead angle by maneuvering the aircraft such that the shell line goes through the target]).

Even for non-headup display systems the pilot's mental burden can be greatly alleviated using innovative display symbology. A landing display, as shown in U.S. Pat. No. 4,368,517 granted to Lovering for an "Aircraft Landing Display System," is representative. Lovering discloses a non-headup display fixed in the cockpit for imaging a runway in the correct perspective to enable the pilot to ascertain his position with respect thereto, particularly under low visibility conditions, and further, to ascertain the consequences of various corrective maneuvers. The display includes a horizon reference line symbol fixed in a horizontal position with respect to the frame of the display. Below this horizon reference line a runway symbol is presented in size and perspective as if representing the actual runway viewed from the aircraft. These two symbols are combined with an aircraft symbol below the runway symbol to provide a real world display from which the pilot can ascertain the attitude of his aircraft and the progress of his approach. Lovering describes his display as providing the pilot a view of the runway, horizon and aircraft as if viewed from a position in space detached from the aircraft.

Lovering's display tries to recreate external visual cues inside the cockpit. "Contact" flight means that the pilot is flying the aircraft utilizing such external visual cues which he can see outside the canopy, e.g., the horizon, sky, clouds and objects on the earth. Contact flight is distinct from "instrument" flight which is generally used under adverse visibility conditions. Although meaning different things to different persons, "contact-analog" can be used to mean, in a very general way, the provision of visually analogous information which is simulative of "contact" flight. Defined thusly, Lovering's airport runway display is of the contact-analog type.

There exist two basic categories of contact-analog displays: "outside-in" and "inside-out." For example, an "outside-in" type of contact-analog vertical gyro indicator is made up of a circular dial on the instrument panel having the horizon presented immovably in a horizontal position etched across the dial while a smaller line with a circle in the middle, symbolically representing the aircraft in section, tilts on a moveable axis in the center of the dial with respect to the artificial horizon in order to indicate the roll attitude of the aircraft The symbol rises or lowers with respect to the horizon to indicate pitch. Lovering's airport runway display may be classified as of this type also. Outside-in displays give the pilot an acceptable "feel" for the relation between his control actions and their effects. The pilot is enabled to think of himself, for example, as observing his aircraft in a detached way from the perspective of a chair situated at a point in space outside, above and to the rear of the canopy. The chair has a fixed attitude with respect to the earth. Thus, the "outside" world is brought "in" to the cockpit.

For an example of the other type, an "inside-out" type of contact-analog vertical gyro indicator always shows the aircraft symbol immovably and horizontally with respect to the instrument panel while the horizon line tilts on the dial to indicate aircraft roll and moves up or down to indicate pitch. Rolston's aircraft attitude reference display may be classified as of this general type. Inside-out displays are widely used because they convey, as opposed to outside-in displays, a better "feel" for the orientation of the aircraft in relation to the horizon. For the inside-out vertical gyro indicator, the pilot sees the artificial horizon tilting with respect to the fixed aircraft symbol in much the same way as he sees the actual horizon "tilting" outside the canopy with respect to the aircraft fuselage Rolston takes this concept one step further by having the pilot thinking of himself as if in an aircraft gimballed on a three axis platform at the center of a transparent "sphere" having heading and pitch angle symbology fixedly etched thereon. The "sphere" translates along with the aircraft but, unlike the aircraft, keeps its attitude stable with respect to the surface of the earth.

A recently developed system for aircraft pilots, more particularly for helicopter (Apache) pilots, is described in U.S. Army Publication TM-55-1520-238-10, pp. 4–19 through 4–24. Therein is described a helmet mounted display system suitable for presenting certain flight information to a helicopter pilot including symbols indicative of aircraft operating and aircraft flight parameters such as engine torque, aircraft airspeed, rate of climb and a horizon indicator. These indications, along with an attitude indicator are presented before the pilot's eyes so he doesn't have to look down. The indicator is of the inside-out type.

As mentioned, both the outside-in and the inside-out approaches have their advantages The disadvantages for each approach arise because of the mental vantage point peculiar to each, not quite real, which the pilot should assume in order to properly interpret the display using a given cognitive faculty. The mental assumption of the artificial vantage point results in the emphasis of perceptions obtained using the given cognitive faculty.

The assumed vantage point disjoints the emphasized perceptions from related perceptions which are normally felt along with the emphasized perception. This is due to the related perceptions being not necessarily best interpreted from the assumed vantage point. There may even be a conflict between perceptions obtained from normally harmonious faculties.

For example, to properly interpret an inside-out vertical gyro indicator the pilot has to align his visual axis with the longitudinal axis of the sectional aircraft symbol and mentally identify the attitude of his body with that of the fuselage. Similarly, in order to properly interpret the markings on Rolston's "sphere" the pilot has to think of his body, with head erect and facing forward, as being rigidly "at one" with the aircraft. This is due to the association and hence the orientation of the display information with the longitudinal axis of the aircraft. For the Apache head-mounted display, described above, the pilot should also think this way but may become somewhat disoriented if he uses the attitude indicator after turning his head away from forward. In all these cases, the fact that it is the pilot and not the aircraft that is perceiving the symbology is ignored and the simulative efficacy of this particular inside-out "contact-analog" technique is thereby adversely affected to a significant degree.

Similarly, Lovering's outside-in display requires the pilot to assume the role of a detached observer who, although supposedly viewing a perfectly stable and horizontal horizon as shown for example in position 8 of FIG. 2b of U.S. Pat. 4,368,517, is nevertheless physically experiencing the aircraft roll effect depicted by the aircraft symbol in the Figure. The angular acceleration forces the pilot actually experiences conflict with those which would be experienced by the detached observer whose vantage point he is at the same time trying to mentally assume.

In view of the nature of our invention, as disclosed in detail below, it will become apparent that the problem with the prior art contact-analog concepts described previously, and this goes to the heart of our invention, is that they all decouple the pilot in one way or another from that which is displayed, i.e., from either the aircraft (outside-in) or the real world (inside-out). In other words, the present state-of-the-art contact-analog displays use the aircraft or the earth as the referent and the pilot has to mentally assume that the referent really is, from his point of view, a stable reference which is not always true. In retrospect, based on a knowledge of the teachings disclosed herein, it would therefore have been more advantageous had the prior art presented such contact-analog information in a manner which avoided decoupling the pilot from what was displayed.

DISCLOSURE OF THE INVENTION

The object of the present invention is to provide a helmet related display method for providing symbolic images to a pilot in an aircraft.

According to the present invention, the position and attitude of the aircraft with respect to the earth are sensed. An aircraft position signal and an aircraft attitude signal are then provided In addition, the attitude of the helmet with respect to the aircraft is sensed and a helmet attitude signal is provided. (For ease of expression, these position and attitude signals, though in reality often pluralities of signals, will be referred to herein in the singular. Thus, it will be understood that the expression "helmet attitude signal," in the proper context, may refer to a plurality of helmet attitude signals, such as helmet pitch, roll and yaw signals or a plurality of position signals such as latitude, longitude and altitude. It should also be understood that it is of course possible to incorporate three such pieces of position or attitude information into a single signal).

As an approximation, in the absence of helmet positional sensing, the helmet can be considered to be positionally coincident with the aircraft and the aircraft position signal can therefore be used in lieu of a helmet position signal, can simply be renamed as the helmet position signal, or if the positional reference point of the aircraft differs significantly from that of the helmet, the aircraft position signal can be modified to take into account this difference.

In response to the aircraft attitude signal and helmet attitude signal, the attitude of the helmet with respect to the earth is determined and a transformed helmet attitude signal is provided. In response to the aircraft or helmet position signal and the transformed helmet attitude signal, one or more symbolic images of one or more corresponding points of interest on the earth which are within a defined field of view of the pilot within the helmet are then provided so as to coincide, from the point of view of the pilot, to the actual positions on the earth of the corresponding points of interest, regardless of the helmet's attitude with respect to the aircraft and regardless of the aircraft's attitude with respect to the earth. The approach effectively couples the pilot's field of view to actual points of interest on the earth by means of symbolic imagery which, from his point of view, overlays the earth at exactly those points of interest. The aircraft is used merely as an intermediary and is not used as the ultimate referent. Rather, the pilot is the ultimate referent since it is his visual faculties which are used to interpret the symbolic imagery.

In further accord with the present invention, a plurality of earth position signals indicative of the positions of the points of interest on the earth may be stored and retrieved from storage in response to the aircraft or helmet position signal. The positions of the corresponding one or more earth positions with respect to the position of the aircraft or helmet may then be determined from the magnitudes of the aircraft or helmet position signal and the one or more retrieved earth position signals. Modified or helmet-oriented earth position signals indicative thereof may then be provided. It may then be ascertained, in response to the one or more helmet oriented earth position signals and the transformed helmet attitude signal, whether the positions of the corresponding one or more earth positions are within the pilot's field of view. If so, one or more symbolic images indicative of the corresponding one or more earth points of interest are provided to the eyes of the pilot so as to coincide, from his point of view, with the actual earth positions.

The stored plurality of earth position signals may be of any points of interest on the earth such as targets or may, for another example, be a sequence of waypoint position signals indicative of the position of waypoints in a selected flight path with respect to the earth. In that case, a current waypoint position signal indicative of the position of the current or upcoming waypoint in the flight path is retrieved and a determination of the position of the aircraft or helmet with respect to the current waypoint is made in order to provide a helmet-oriented current waypoint position signal indicative thereof. Whether the position of the current waypoint is within the pilot's field of view is then ascertained and, if so, the provision of a symbolic image indicative of the current waypoint is provided so as to coincide, from the point of view of the pilot, with the actual position of the current waypoint on the earth.

If it were determined that the position of the current waypoint is not within the pilot's field of view, another symbol, indicative of the direction in which the pilot's head or aircraft may be turned in order to bring the symbolic image of the current waypoint within the pilot's field of view may, without limitation, be provided instead.

In addition to a current waypoint, a subsequent waypoint position signal can be retrieved from storage in response to the aircraft position signal, indicative of the position of the waypoint in the flight path after the current waypoint. Of course, the same determination in regard to the position of the aircraft or helmet with respect to the subsequent waypoint and the provision of a helmet-oriented subsequent waypoint position signal must necessarily be executed. After that determination, it is ascertained as to whether the position of the subsequent waypoint is within the pilot's field of view and, if so, a symbolic image thereof is provided so as to correspond, from the point of view of the pilot, with the actual position of the subsequent waypoint on the earth.

The provision of symbolic images of actual waypoints rather than of a roadway image of the actual flight leg on the surface of the earth is particularly advantageous for nap-of-the-earth flight where it is virtually impossible to confidently lay out such a roadmap because of the likelihood of the pilot encountering unanticipated obstacles. The provision of a small number of usually relatively distant waypoints provides the pilot with more freedom to maneuver along each preselected flight leg.

Such a waypoint display will allow the pilot to acquire flight plan (navigational) information, as well as heading/steering command cues, more quickly and with less cognitive processing than is currently required. This display concept will allow the pilot to readily perceive the location of the upcoming waypoint due to its superimposition over the real-world view, providing a better means of information transfer.

In still further accord with the present invention, the manner in which the waypoints are retrieved may be thought of as progressing from retrieving a first waypoint position signal and identifying that signal as the current waypoint position signal until it is passed. At the same time as the first waypoint position signal is retrieved, a second waypoint position signal (next in sequence) is retrieved and identified as the subsequent waypoint position signal indicative of the position of the next waypoint in the selected flight plan after the upcoming or current waypoint. After determining whether the aircraft is within a first selected distance of the current waypoint, a two-part test is performed. First, a determination is made as to whether the aircraft or helmet has an increasing distance between itself and the upcoming waypoint; if so, a second determination is then made as to whether or not the distance between the aircraft or helmet and the subsequent waypoint position is decreasing. If so, the subsequent waypoint is from that point on identified as the current waypoint and a third waypoint position signal is retrieved from storage and identified as the new subsequent waypoint position signal. If both parts of the two-part test are not satisfied, and the aircraft comes within a second selected distance of the current waypoint (less than the first selected distance) before the two-part test is satisfied (i.e., it is determined that both the distance to the current waypoint is increasing and the distance to the next waypoint is decreasing), the identity of the current waypoint is at that point automatically changed to that of the next waypoint. The same process is continued until the destination is reached.

In still further accord with the present invention, the position of the helmet with respect to the aircraft may additionally be sensed and a helmet position signal provided. The information on the helmet's position may then be utilized in providing symbolic images, so that the coincidence of the images to the earth is adjusted more exactly, to account for translations of the helmet within the aircraft Thus, in addition to the three rotational degrees of freedom, the one or more of the three translational degrees of freedom of the pilot's head with respect to the cockpit may be taken into account. This provides a more exact contact-analog image overlay on the real earth.

In still further accord with the present invention, an image of a steering cue may be provided to the pilot in order to indicate an aircraft heading consistent with following the preselected flight plan to the current waypoint or, in some cases, the next waypoint. The steering cue may be presented in close proximity to and with respect to the horizon or a helmet compass bearing symbol. It may take the form of a carat-shaped symbol which moves horizontally just below a compass heading symbol which the pilot can follow in order to stay on or get back on the current flight leg. The carat symbol may, for example, have 3 possible orientations: if the direction-to-steer is within plus or minus a selected number of degrees (e.g., 19 degrees) of the vertical centerline of the pilot's field of view, then the carat points upward, as shown in FIG. 2A; if the direction-to-steer is beyond plus or minus the selected range then the carat will rotate to either point left or right to cue the pilot which way to turn to bring the carat within the selected range.

The steering cue may be provided so as to guide the pilot back on the current flight leg or, upon closely approaching a current waypoint where the next flight leg will shortly be in a different direction, to guide the pilot so as to enable him to turn the "corner" in a smooth manner. An aircraft symbol may be provided in conjunction with the steering cue to indicate the heading of the aircraft with respect to the horizon or the helmet compass bearing symbol.

In still further accord with the present invention, as suggested in the previous paragraph, symbolic images may be provided within the field of view of the pilot having compass bearing symbols superimposed on the earth's horizon such that it appears, from the point of view of the pilot, to have compass bearing symbols permanently affixed thereto, regardless of the helmet's attitude with respect to the aircraft and regardless of the aircraft's attitude with respect to the earth. This indicates the portion of the compass instantaneously encompassed by the pilot's field of view.

In still further accord with the present invention, instead of having the helmet compass bearing symbolic images "affixed" to the earth's horizon, they can be presented to the pilot oriented horizontally within his field of view, regardless of the helmet's attitude with respect to the aircraft and regardless of the aircraft's attitude with respect to the earth. This mode is particularly useful for military aircraft where a simple line image of the horizon is desired, not cluttered by extraneous symbology. The compass bearing symbology can be affixed in the upper part of the pilot's field of view and can be provided so as to move along with his head motions without regard to the position of the aircraft with respect to the earth or of his head with respect to the cockpit.

In still further accord with the present invention, the provided image is a simple line image of the earth's horizon.

The present invention advances the state-of-the-art in contact-analog display technology by avoiding decoupling the pilot from what is displayed. Instead of using the aircraft or the earth as the referent and forcing the pilot to mentally assume a vantage point that is mentally difficult to maintain the images are referred to the pilot himself and the aircraft is merely used as an intermediary. In this way, the pilot does not have to assume any artificial vantage point as everything is referred to him. Thus, the present invention revolutionizes the contact-analog display art by obviating the need to make a choice between either the outside-in or inside-out type of display. These distinctions are no longer meaningful as the new approach eliminates the need to make artificial constructs.

BEST MODE FOR CARRYING OUT THE INVENTION

Figure 1:
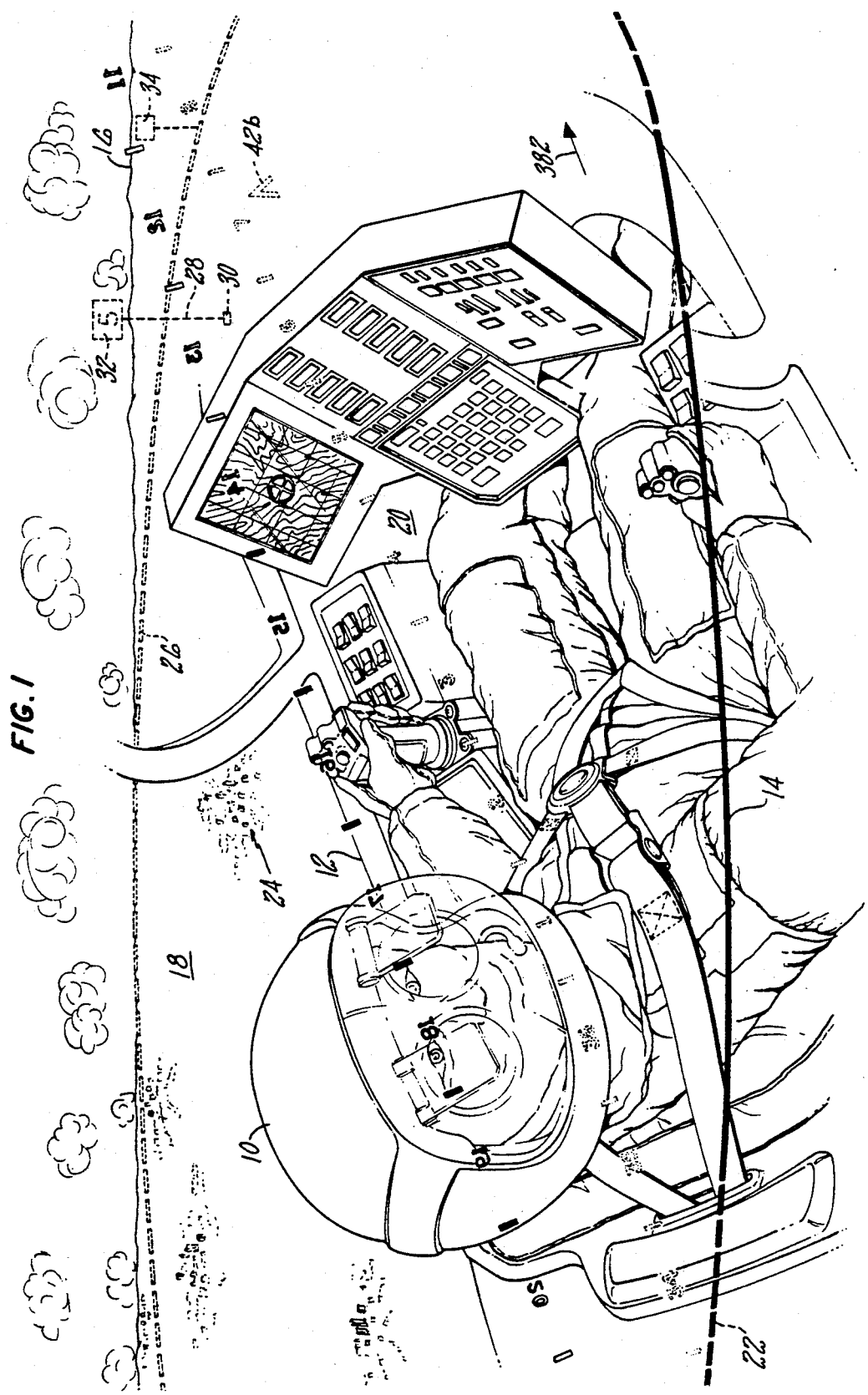
FIG. 1 is an illustration of a pilot in a cockpit in an aircraft over flying the surface of the earth and viewing symbolic images presented, according to the present invention.

FIG. 1 is an illustration of a pilot 10 in an aircraft 12 viewing a symbolic image 14 of the horizon 16 of the earth 18, from the point of view of the pilot, regardless of the helmet's position and attitude with respect to the aircraft and regardless of the position and attitude of the aircraft with respect to the earth. It will be noted that the symbolic image of the horizon line within the field of view of the pilot is shown as a solid line. Extending over the pilot's right shoulder behind the aircraft's cockpit 20, a dashed line 22 is shown indicating that if the pilot turned his head or aircraft further to the right he would see a solid line in the position of dashed line 22. At the same time, an equal portion of the other end of the line would disappear from the left-hand field of view. Similarly, if the pilot were to turn his head or his aircraft to the left in order to view a city 24, a portion of the dashed line 26 corresponding to his field of view would become solid and would be lined up, from his point of view, with the horizon line 16.

Thus, it will be appreciated that the lines 14, 22, 26 form pieces of a circle surrounding and centered on the pilot's head which, when viewed through his eyes, coincides with the earth's horizon. Of course, the dashed portions of the circle are not imaged and therefore do not exist unless they are within the field of view of the pilot at any given point in time. The dashed line 22 is shown in solid shading in order to indicate that it would be located in front of the pilot's face from the perspective of the drawing. The phantom portion 26 of the circle is shown in that manner in order to indicate that it is behind the aircraft, from the perspective of the drawing (actually, the numeral 26 is to the left front of the aircraft's fuselage if it is assumed that the aircraft is heading to the upper right of the drawing).

It will be noted that, from the perspective of the drawing, only a small portion of the phantom horizon line 26 actually coincides with the horizon 16. However, this is because the perspective of the drawing is different from that of the pilot. From the perspective of the pilot, all portions of the horizon line 14, 22, 26 would coincide with the actual horizon line 16, regardless of the position and attitude of his head and regardless of the position and attitude of his aircraft.

As mentioned in the Background Art section above, one of the more time consuming and distracting activities which a pilot is called upon to perform is the overflight of the pre-planned flight plan having a number of waypoints or flight benchmarks marking turning points at the ends of flight legs. It will be noted that in the upper right of FIG. 1 is illustrated a flagpole-like symbol 28 which is indicative of one such waypoint. In fact, the waypoint 28 illustrated happens to be the current or upcoming waypoint in the flight plan. The waypoint symbol intersects the horizon line 26 but is not actually within the field of view of the pilot as shown in FIG. 1 and so is shown only in phantom to indicate that it is not presently being imaged but that it would be seen in the position shown if the pilot were to turn his head so that he were looking forward and slightly to the left. The waypoint symbol 28 is shown in such a way that its base 30 is "positioned" on the earth, from the point of view of the pilot, such that it coincides along the line of sight of the pilot with the actual waypoint on the surface of the earth. Actually, as the position of the aircraft get closer to the waypoint position 30 the base of the "flagpole" will "sink" lower and lower with respect to the horizon until, as the aircraft passes by the waypoint, the angle subtended between a line from the aircraft to the waypoint base and a line from the aircraft to the horizon approaches 90°. Naturally, as the aircraft approaches the waypoint 28 the staff of the flagpole is allowed to "grow" so that it get longer and longer as the aircraft approaches. This may be done by keeping the portion of the flagpole above the horizon line the a fixed length while allowing the length of the flagpole extending below the horizon line to get larger. It should be understood that the manner in which the symbolic "growth" is effected depends on the aircraft's altitude. Thus, a pilot in a relatively low flying aircraft will from the outset see a current waypoint with a relatively long stem below the horizon while a pilot overhead the same position at a higher altitude will see a shorter stem initially and, presuming they fly over the same path, the higher pilot will see the stem grow faster and to a larger extent. A "flag" or box 32 is set on top of the flagpole staff 28 and may have a numeral on it to indicate either its waypoint number or the distance to the waypoint, for example. An additional waypoint 34 may be provided to indicate the next waypoint after the current waypoint 28, 30, 32. It may be presented having a smaller sized box on a truncated flagpole staff only extending slightly above the horizon and not extending at all below the horizon.

In addition to providing waypoint symbology, other types of symbols relating to points of interest on the earth may also be provided, without limitation. These various types may include target information, grid-like projections indicating latitude and longitude or other map coordinate information, etc. It will be appreciated that a wide variety of different types of symbols of points of interest on the earth may be conceived of and imaged symbolically in a manner in keeping with the teachings of the present invention, for example and not by way of limitation, for waypoints or for the horizon, exhaustively described herein. The fact that other possible symbols of other types of points of interest are not described in detail should not be construed as limiting the scope of the present invention to only those symbols specifically described. Although several other types of symbols will also be described hereinafter, the descriptions thereof should be similarly understood as not limiting the invention to only such symbols.

In addition to the horizon line 14 and the waypoint symbology shown in FIG. 1, there is an additional set of symbols shown crossing in front of the pilot's field of view indicative of the compass points on the earth. The pilot's eyes are shown looking up at these symbols and would be indicative to him that he is looking in a almost due south direction, as indicated by the numerals 17 and 18, as seen in reverse from the perspective of the drawing but which would be seen correctly by the pilot, from his perspective. The numerals are shown solidly shaded from about 140° to 200° which indicates, without limitation, about a 60° horizontal field of view for the pilot. Outside of this range the compass bearing symbols, though non-existent, are shown unshaded for teaching purposes in order to indicate the compass bearing symbols that would be seen by the pilot if his head were yawed from its presently illustrated position. Thus, the compass bearing symbol images are shown as projected onto a circle centered on the pilot's head. The circle, unlike the horizon line circle, tilts with the pilot's head. Thus, the compass bearing symbol imagery may be thought of as projected onto a circle at infinity. The circle lies in a plane above and perpendicular to a plane which cuts vertically through the centers of rotation of the pilot's eyes. It will be appreciated that this manner of presentation of compass bearing symbology is advantageous for combat aircraft in which it is desired not to clutter the horizon line with too much symbology which might obstruct the pilot's view in combat type situations It will also be appreciated, however, that such symbology could also be placed in a permanent position on the horizon line similar to line 14 so that it does not move with the pilot's head.

Other types of symbology may also be provided, in addition to the above described contact-analog symbology, not related to positions of interest on the earth. For instance, if the pilot were to look forward he could be presented with a pitch ladder and a roll indicator which are always presented in a forward direction with respect to the longitudinal axis of the aircraft. These images would only be presented to the pilot if he were to look forward. On the other hand, some images may be selected to be presented in a static fashion which, when selected, would always remain in the same position with respect to the pilot's head, no matter which way he turned his head.

Figure 2A:
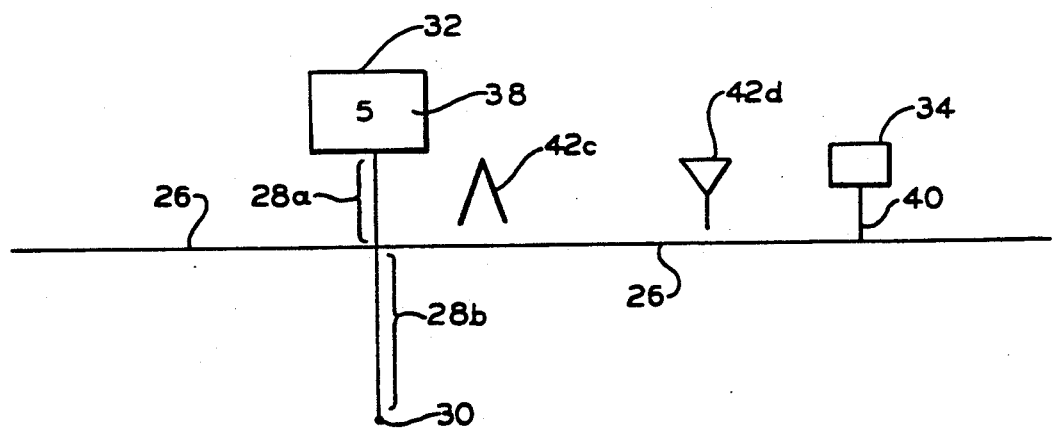
FIG. 2A is an illustration of waypoint symbolic images, along with a steering cue symbolic image, provided according to the present invention.
Figure 2B:
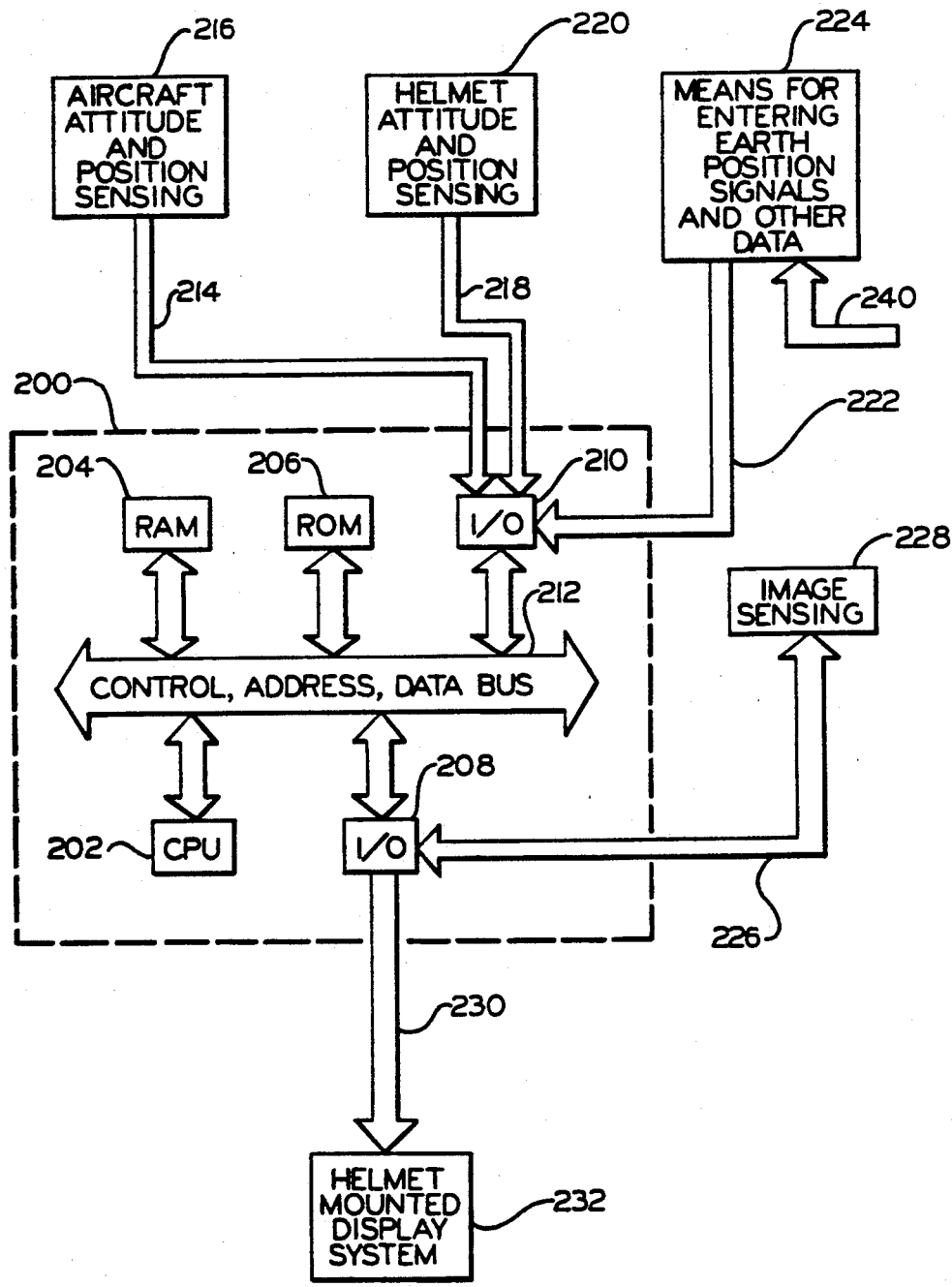
FIG. 2B is an illustration of a signal processing unit interfacing with a number of sensing devices, an input device and a helmet mounted display system, according to the present invention.

Referring now to FIG. 2A, the waypoints 32, 34 of FIG. 1 are there shown in more detail, as they would be seen by the pilot with his head turned in the direction indicated in FIG. 1 (about northeasterly) to the left front of the aircraft. Of course, although only two waypoints are shown displayed at a time, there may be a large number of such discrete ground reference positions to be imaged in a sequential series of pairs of waypoints to be headed for in sequence in each leg of a mission. As each current waypoint is passed, the old waypoint disappears, the next waypoint becomes the current waypoint and a new next waypoint is retrieved from storage and imaged.

The display format utilizes a pictorial representation of the flagpole-like navigational cues, showing both the upcoming and subsequent waypoints. The large rectangular flag 32 represents the upcoming (current) waypoint along the programmed flight plan. The vertical height of the flag 28a relative to the displayed horizon line 26 does not change, but the stem 28b "grows") as the waypoint gets closer, as if it were attached to a point on the virtual ground-plane. The manner of "growth" will vary, as discussed above, depending on altitude. The flag has a digital display 38 which may be the waypoint's identifier or which may display the distance to the waypoint. The flag will always remain perpendicular to the horizon line from the pilot's point of view (even when the pilot tilts his head or aircraft). The bottom of the stem has a small solid symbol 30 attached to it which, from the pilot's point of view, is superimposed on the surface of the earth at the ground position of the actual waypoint on the earth. The upcoming flag should thus be considered as having been "planted" at a specific geographical location in the real-world.

The smaller square flag 34 depicts the location of the subsequent (next) waypoint in the flight plan. Unlike the larger flag, a stem 40 of the small flag does not grow beneath the horizon line 26. The stem 40 of the flag 34 also always remains perpendicular to the horizon line. There is preferably no digital display in the smaller flag 34.

Assuming the pilot's head remains in the same position, both of these symbols 32, 34 will move horizontally (left/right) in proportion and relative to lateral translations or yawing of the aircraft. This is necessary in order that the images remain stable with respect to the earth, from the pilot's point of view. Similarly, the symbols and the horizon symbol 26 will move vertically in proportion and relative to vertical translations or pitching of the aircraft. Finally, the waypoint and horizon symbols will rotate in proportion and relative to rolling of the aircraft.

Assuming the aircraft's attitude remains fixed with respect to the earth, the horizon symbol and both of the waypoint symbols will similarly rotate and move horizontally and vertically in response, respectively, to rolling, yawing and pitching of the pilot's head. The translational position of the pilot's head with respect to the cockpit can also be taken into account.

Of course the pilot's head does not generally remain stationary, nor does the aircraft retain a fixed attitude. According to the present invention, both of these effects are taken into account simultaneously in presenting images for "contact-analog" (in the sense disclosed herein) viewing by the pilot.

An algorithm determines when the aircraft has "passed" the current waypoint and the waypoints (past, current, and next) are updated. Basically, the procedure may be thought of as being a periodic determination of whether the aircraft is within a first selected distance of the current waypoint and, if so, whether it is still approaching the current waypoint and, if not, whether it is now approaching the next waypoint. If so, the next waypoint is thenceforth identified as the current waypoint. A further test determines whether the aircraft is within a second selected distance, less than the first selected distance, of the current waypoint. Regardless of negative outcomes for the above described waypoint approach tests (performed while within the first selected distance of the current waypoint), the next waypoint is identified as the current waypoint if the aircraft's position to the current waypoint becomes less than the second selected distance.

Also shown in FIG. 2A is a steering cue 42c, shown differently in FIG. 1 as a cue 42b (in close proximity to the compass bearing symbol), which may operate, for example, in conjunction with the waypoint display or, as shown in FIG. 1, the compass bearing symbology. The steering cue is presented to the pilot to indicate a bearing, if within his field of view, that he may steer toward in order to reach the current waypoint. If outside his field of view a symbolic indication of which direction to turn to bring the steering cue within view may be provided. A heading symbol 42d may be provided to indicate the aircraft's current heading. Symbol 42d may be displayed near and with reference to the horizon symbol, along with the steering cue symbol, or both symbols may be displayed together, near and with reference to the compass bearing symbol of FIG. 1. In FIG. 1, the symbol 42d is not shown imaged, due to the aircraft heading being to the upper right and off the illustration. If illustratable, the symbol 42d would have appeared near symbol 42b and to its right, in close proximity to the compass symbol, just over the upper right edge of the Figure, such that the pilot would always see symbol 42d forward of the aircraft aligned with the longitudinal axis thereof.

As described above, the purpose of the waypoint flags 32, 34 is to indicate to a pilot the real world location of the current waypoint (the one being flown to) and the next waypoint These flags occupy their real world positions with respect to the horizon line both in azimuth and distance from the aircraft The distance from the aircraft is suggested (although influenced by altitude) by the waypoint flag pole growing larger as the aircraft approaches the waypoint Similarly, the purpose of the steering cue 42c is to aid the pilot in reaching the current waypoint If the aircraft's position is off the flight leg (a straight line connecting the last and current waypoints), the steering cue directs the pilot to return to the flight leg in a gradual and smooth manner (not to fly directly at the waypoint). Although the steering cue is illustrated in FIG. 2A in close proximity to the horizon line 26, it may also be placed in close proximity to the compass bearing symbol as shown by the steering cue 42b of FIG. 1.

Figure 2C:
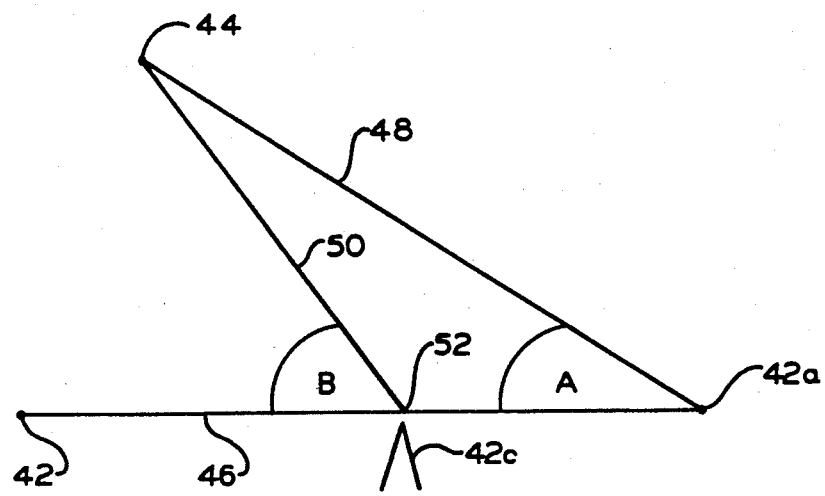
FIG. 2C is an illustration of angular relationships between a current flight leg and a current aircraft position, according to the present invention.

Referring first to FIG. 2C, a point 42a corresponds to the position on the ground of a current waypoint and a point 42 represents the last waypoint. A point 44 corresponds to the present position of the aircraft. An angle A measures the angle between a current flight leg 46 and a line 48 from the current aircraft position to the current waypoint. An angle B is indicative of the angle between the leg 46 and a line 50 projected from point 44 in the direction to be indicated by the steering cue, intersecting leg 46 at a point 52.

The algorithm is to set angle B equal to the arctan of a constant times tanA. The constant will, without limitation, most advantageously be set to a value between 1.5 and 3. As the position of the aircraft changes, the value of A and hence B will change as well. This algorithm will guide the pilot in a smooth manner from the current aircraft position onto the current flight leg.

Figure 2D:
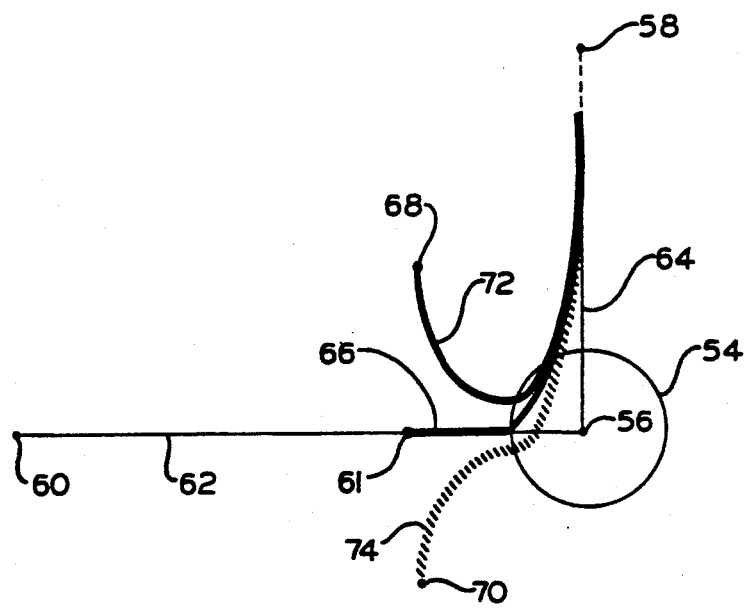
FIG. 2D is an illustration of several possible flight paths an aircraft might take in following a steering cue provided, according to the present invention.

The algorithm can also be set up to guide the pilot into a smooth cornering turn when nearly approaching a new flight leg. For example, some typical flight paths are shown in FIG. 2D. These paths would be steered by the pilot from the various positions illustrated in following the steering cue, onto to a new flight leg for a plan having a right angle turn. A circle 54 has a selected radius which, when reached, triggers the steering cue to start guiding the pilot toward the next waypoint so that the necessary turn may be executed efficiently. It should be understood that, at the same time, the identity of the current waypoint for waypoint imaging purposes will not yet necessarily, or even usually, immediately change. (The selected radius for the circle may, nevertheless and without limitation, be equal to the first selected distance described above in connection with when to change the identity of the current waypoint for waypoint imaging purposes). The fact that a change is anticipated is utilized to cause the steering cue to nevertheless provide the pilot the opportunity to follow a course which will result in an efficient turn.

FIG. 2D also illustrates a waypoint 60 which preceded waypoint 56 in the flight plan. Starting with an aircraft position 61 on a preplanned flight path 62 between points 60 and 56, the aircraft's sensed position upon crossing circle 54 will trigger a change in the steering cue so that it begins to provide the pilot with a cue as to a direction in which he may steer the aircraft in order to efficiently "turn the corner" toward the next waypoint 58, even before it becomes the current waypoint. At that time it begins to guide the pilot onto a curved path which will bring him onto a leg 64. Thus, the algorithm will cause the steering cue 42 to smoothly steer the pilot onto the leg 64 along the curved portion of a path 66 shown with a heavy line. Two other examples show starting positions 68, 70 resulting in flights along paths 72, 74, respectively, onto flight leg 64. It will be noted, in all cases, that the crossover of the circle 54 causes a change in course even though the identity of the next waypoint, for waypoint imaging purposes, may not have yet changed to that of the current waypoint.

Figure 8:
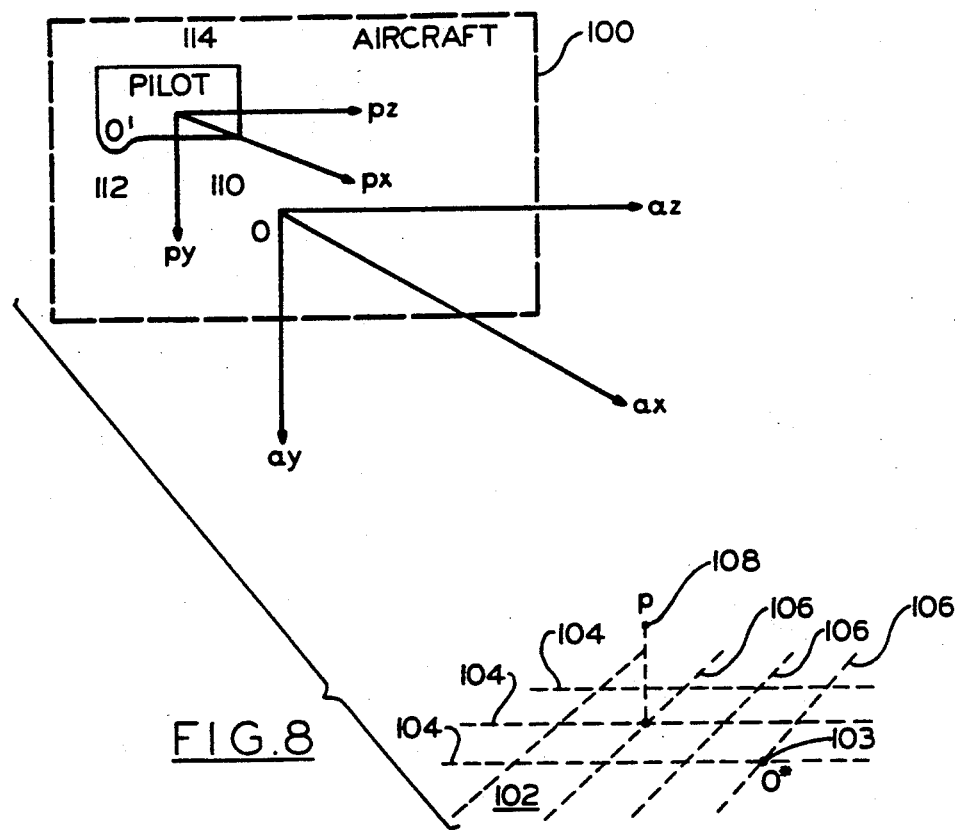
FIG. 8 is an illustration of three separate coordinate systems associated with the earth, the aircraft and the pilot, according to the present invention.

Referring now to FIG. 8, three rectangular coordinate systems are illustrated. (It should be understood that other types of coordinate systems could be used as well). An aircraft 100 is illustrated in flight over a hatched surface 102 having an origin (O*) 103 representative of an earth terrain wherein a plurality of parallel lines 104 are latitude lines and wherein a second plurality of parallel lines 106 intersecting the latitude lines at right angles are longitude lines. These hatched lines are representative of the actual longitude and latitude of the earth, and provide a ready coordinate reference system by which a point, such as a point 108 may be referenced. Point 108 is illustrative of any point located on or adjacent (such as a building, or structure) to the earth, as shown. The point 108 is referenced by its latitude and longitude coordinates. Further, the altitude of the point 108 above sea level is used to provide a third orthogonal coordinate which, in conjunction with the longitude and latitude coordinates provides, if the earth is assumed flat, a three axis Cartesian coordinate system which may be used as a reference coordinate system, hereinafter designated as the "earth coordinate system," or "ECS."

FIG. 8 further illustrates a second reference coordinate system which is illustrated by three mutually orthogonal axes labeled "ax", "ay" and "az" emanating from an origin (O) 110 fixed in the aircraft 100. These three axes define an aircraft coordinate system, or "ACS," which is used to provide a coordinate reference system by which points may be referenced. As shown, the ACS is a three axis coordinate system wherein the origin (O) 110 of the ACS may be located at any point on or within the aircraft. Preferably, the ACS is oriented so that the az axis coincides with the longitudinal axis of the aircraft (positive being in the forward direction), the ax axis oriented perpendicularly to the az axis and extending in a positive direction to the right of the aircraft, so that a plane defined by the az axis and the ax axis is horizontal with respect to the aircraft. The ay axis is perpendicular to both the ax and az axis and extends positively in a "downward" direction. This relationship is illustrated on FIG. 8.

Figure 9:
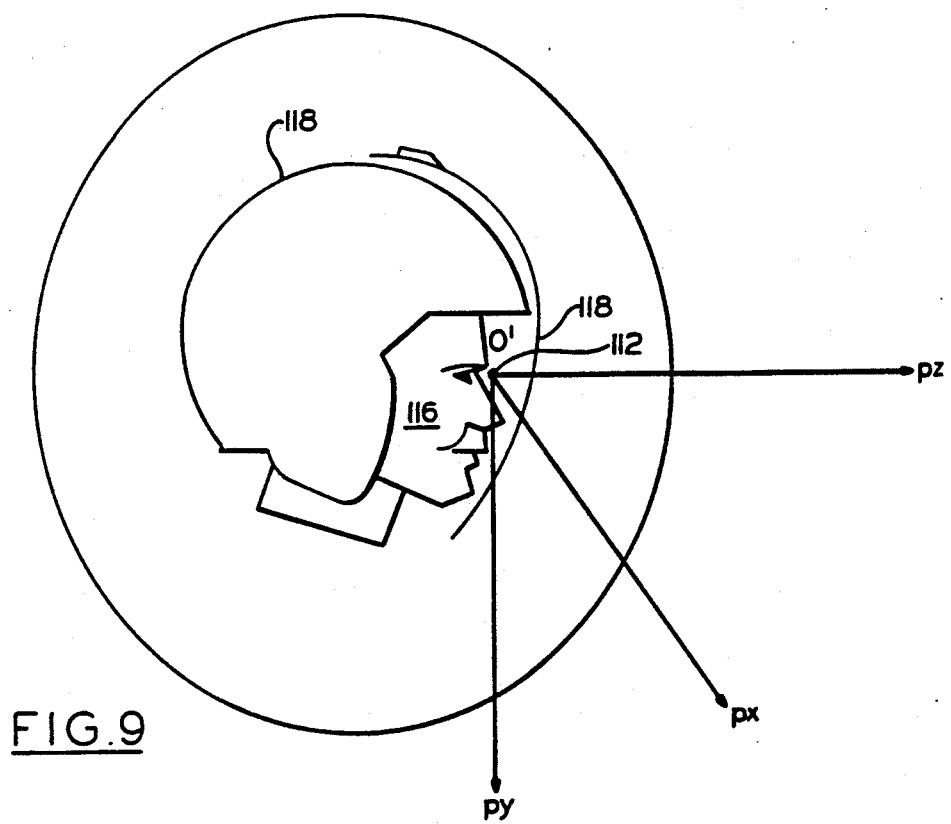
FIG. 9 is an illustration of a pilot wearing a helmet mounted display unit and having a coordinate system such as that shown in FIG. 8 illustrated in more detail.

FIG. 8 further illustrates a third reference coordinate system, the pilot coordinate system, or "PCS" which is illustrated as three axes labeled "px," "py" and "pz" which emanate from a common origin (O') 112 related to a pilot 114 within the aircraft As with the ACS, the axes of the PCS are mutually perpendicular and are illustrated for a pilot looking forward with his head level and erect as shown in FIG. 9. They define a coordinate reference system which is used to locate points within the pilot's field of view.

Turning now to FIG. 9, a pilot's head 116, helmet 118 and a generalized helmet mounted display device 118 are illustrated. As shown, the pilot views the real world through the helmet mounted screen. Further shown is the relationship of the pilot and the PCS showing the px coordinate to the right of the pilot's line of sight, the py coordinate downward and the pz coordinate along the pilot's line of sight. In order to properly position the horizon and waypoint symbology with respect to the pilot's helmet-mounted display, according to the present invention, it is useful to conceive of the earth 102, the aircraft 100 and the pilot's helmet 118 as being associated with the three separate coordinate systems having the separate origins 103, 110, 112 (O*, 0, 0'), respectively, freely translating and rotating with respect to one another.

With regard to translation, as known in the art of analytic geometry, two coordinate systems having their origins translated out of coincidence can be brought into coincidence by means of a parallel shift.

I.e., if the origin 103 (O*) of the earth coordinate system has coordinates $a_1$, $a_2$, $a_3$ with respect to the aircraft coordinate system with origin 110 (O), then the relations $$x = x^* + a_1$$

$$y = y^* + a_2$$

$$z = z^* + a_3$$

hold between the coordinates x, y, z of the point 108 (P) of space with respect to the aircraft system and the coordinates $x^*$, $y^*$, $z^*$ of P with respect to the earth system.

Similarly, as is also known, with regard to rotation, two systems having the same origin (O* = O), but having their axes nonaligned, can be brought into alignment using direction cosines or using Euler angles which are, mathematically speaking, equally valid approaches.

In the case of direction cosines, each axis of one system is thought of as making an angle with each axis of the other system. The cosines of these angles are denoted by $a_{ik}$, where i and k run through the values 1, 2 and 3. The first index always refers to the x, y, z-system and the second index to the $x^*$, $y^*$, $z^*$-system. The index 1 corresponds to the x- or $x^*$-axis, 2 to the y- $y^*$-axis and 3 to the z- or $z^*$-axis; that is, $$a_{11} = \cos(x, x^*) \quad a_{12} = \cos(x, y^*) \quad a_{13} = \cos(x, z^*)$$

$$a_{21} = \cos(y, x^*) \quad a_{22} = \cos(y, y^*) \quad a_{23} = \cos(y, z^*)$$

$$a_{31} = \cos(z, x^*) \quad a_{32} = \cos(z, y^*) \quad a_{33} = \cos(z, z^*),$$

where the arguments refer to the angles in the planes formed by the specified axes.

The coordinates of an arbitrary point then transform according to the following equations:

$$x = a_{11}x^* + a_{12}y^* + a_{13}z^*$$

$$y = a_{21}x^* + a_{22}y^* + a_{23}z^*$$

$$z = a_{31}x^* + a_{32}y^* + a_{33}z^*.$$

The $a_{ik}$ are called "direction cosines." The Euler angle or the Euler theorem approach would be similar and will not be described in detail as it will be evident to one skilled in the art of analytic geometry as to how to proceed. (See, e.g.,"Mathematical Handbook for Scientists and Engineers," by G. A. Korn & T. M. Korn, 2nd Ed., McGraw-Hill, 1968, section 3.1-12 for a more general description of translation and rotation of rectangular Cartesian coordinate systems). Similarly, other methods of transformation are known, including more general methods, and by describing only one method it is certainly not our intent to exclude others.

Of course, the aircraft and earth coordinate systems are generally both translated and rotated with respect to each other at the same time. This case is a combination of the two cases considered above and leads to the following equations of transformation:

$$x = a_1 + a_{11}x^* + a_{12}y^* + a_{13}z^*$$

$$y = a_2 + a_{21}x^* + a_{22}y^* + a_{23}z^*$$

$$z = a_3 + a_{31}x^* + a_{32}y^* + a_{33}z^*.$$

Such transformations between coordinate systems are known and can be interpreted as formulae for changing the coordinates of a point by a motion in the fixed space (translation, rotation or a combination of the two) of the coordinate system. (However, they can also be regarded as the analytic representation of a motion of space with the coordinate system fixed).

The above equations could be used for a simple heads-up display case where the aircraft is the referent for imaging purposes. Such transformations are necessary for the display format used by Rolston and Lovering, for example. For the head-mounted display case as taught herein, however, where the pilot's head is the referent, it is necessary to perform an additional set of translations and rotations. I.e., if $O'$, is the origin 112 of the helmet coordinate system and it is desired to transform the same point transformed above from earth coordinates to aircraft coordinates to helmet coordinates, and the helmet's origin is translated from that of the aircraft by distances $b_1$, $b_2$, $b_3$, and the $O'$-centered system (helmet) is rotated with respect to the $O$-centered system (aircraft) as defined by nine direction cosines $b_{ik}$ (defined in a manner similar to that in which the $a_{ik}$ direction cosines were defined), then the helmet coordinates of the point would be:

$$x' = b_1 + b_{11}x + b_{12}y + b_{13}z$$

$$y' = b_2 + b_{21}x + b_{22}y + b_{23}z$$

$$z' = b_3 + b_{31}x + b_{32}y + b_{33}z,$$

and the designer is then enabled to provide symbolic contact-analog images, according to the present invention. It will be understood that the symbolic images provided may be provided by any convenient means such as a holographic display approach, a CRT, liquid crystal, electroluminescent or, for example, any of the developing flat panel display technologies. The choice of display format is not central to the present invention but the choice will of course influence the manner in which symbolic images of points in the object space are mathematically manipulated in order to provide the chosen type of image.

Figure 10:
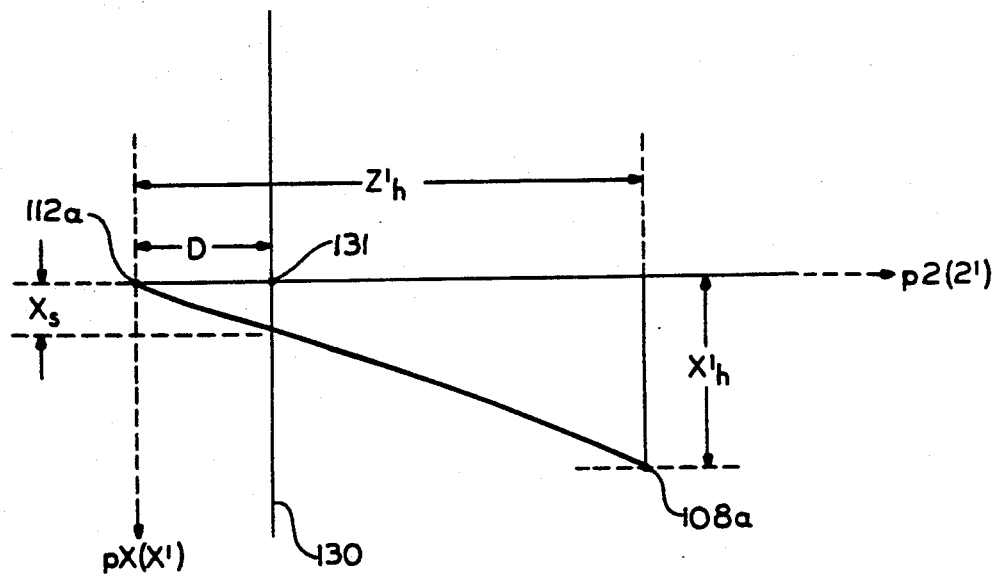
FIG. 10 is an illustration of a method of transforming a point of interest in a three dimensional pilot coordinate system into a two dimensional coordinate system.

For example, for a CRT helmet mounted, headup display type approach (where the images are projected onto collimating optics and are then directed as parallel rays into the pilot's eyes), the pilot may be thought of, without limitation, as viewing the world outside his aircraft through a transparent projection "screen" 130 or "window" as shown in FIG. 10 so that the points of interest on the earth, expressed in helmet coordinates, have their coordinates projected or transformed from the three dimensions of the object space to the two dimensions of the transparent screen, i.e., a decrease in dimensionality (a dimensionality reduction is not a requirement or limitation, since a projection, for example, onto a curved surface might be needed for some applications). This can be thought of as a shadow projection except being a contracted "shadow" rather than the expanded type of everyday experience.

For example, and not by way of limitation, we can consider an origin 131 of a screen coordinate system to be in the center of the screen 130 with the screen $x_s$- and $y_s$-axes in the plane of the screen parallel to the respective $x'$- and $y'$-axes of the helmet coordinate system. The helmet $z'$-axis perpendicularly intersects the screen at its origin. The pilot's eye or point of view 112a lies on this axis at a distance D behind the screen at a point which may be coincident with the origin 112 of the helmet coordinate system shown in FIG. 9.

Now, consider the point 108a with helmet coordinates $x_h'$, $y_h'$, $z_h'$. (These coordinates may have been generated from earth coordinates using the transformations previously described). FIG. 10 represents the components of this point in the helmet system's $x'$-$z'$-plane Applying the well-known laws of similar triangles, it can be seen that if $x_s$ designates the x-component of the point in screen coordinates, $$x_s D = x_h'/z_h',$$

or, solving for $x_s$, $$x_s = D(x_h'/z_h').$$

Similarly, in the helmet $y'$-$z'$-plane, $$y_s = D(y_h'/z_h'),$$

where $y_s$ is the y-component of the point in screen coordinates. As in all of the other coordinate transformations described previously, there are other methods of projection and corresponding methods for accomplishing such transformations. In this case, a particular transformation from three-dimensional space to two-dimensional space is illustrated, but we do not by any means intend to exclude such other transformations, projections or methods.

A refinement to the above illustrated approach is to modify the value of D for points near the edges of the screen, to maintain a constant or approximately constant relationship between the linear separation between the two points, in screen coordinates, and their angular separation at the pilot's eye. This may be desirable when the angles subtended at the eye by the screen edges are large.

Of course, one may desire to express the screen coordinates in a coordinate system having its origin in the top left corner of the screen, as is usual in the art of computer graphics. This may be effected by a simple translation between the screen coordinate system described above and the corner-origined screen system.

Referring now to FIG. 2, a signal processing means 200 is there illustrated having a central processing unit (CPU) 202, a random access memory (RAM) 204, a read only memory (ROM) 206, a pair of input/output (I/O) ports 208, 210 and a control, address, data bus 212. The signal processing means 200 is responsive to aircraft attitude and position sensing signals provided on a line 214 from a sensing unit 216 (which may be comprised of separate attitude and sensing units), helmet attitude and position sensing signals on a line 218 from a sensing unit 220 (which may also comprise a plurality of sensing units), earth position signals and other data signals on a signal line 222 from means for entering earth position signals and other data 224, and image signals along with control signals provided on a line 226 from an image sensing unit 228. The signal processing means 200 in turn provides control signals on lines 226 back to the image sensing unit 228 and also provides image signals on a line 230 for a helmet mounted display system 232.

The sensing means 216 will be suitable for sensing the parameters of aircraft attitude and position. These may be expressed in any number of different signal formats. For example, the aircraft's attitude in 3 degrees of freedom may be sensed with respect to the earth and three separate signals indicative of the aircraft's attitude in each degree of freedom may be provided. Additionally, a group of three signals indicative of the position of the aircraft in a three dimensional coordinate system might also be provided. On the other hand, aircraft attitude may be expressed only with respect to the aircraft's bearing. In other words, an aircraft heading signal would be accompanied by an aircraft pitch signal and an aircraft roll signal referenced to the heading vector. The particular format is not important for purposes of the invention.

Examples of devices which are suitable for both the position and attitude sensing function of device 216 would be an inertial reference systems. Combinations of other, single function systems can be utilized also. Such combinations might draw from attitude reference systems, LORAN type systems, VOR type systems, attitude reference heading systems, radar heading systems, etc.

The aircraft position and attitude signals are then utilized by the signal processing means to transform points in earth coordinates into aircraft coordinates using the technique described above or an equivalent technique.

A suitable helmet sensing means 220 would, without limitation, include any device or combination of devices which may be used singly or in cooperation to sense parameters of helmet attitude with respect to the cockpit or any equivalents thereof, and providing output signals having magnitudes indicative thereof. An example of a suitable helmet sensing means is a three-axis Polhemus system which provides signals indicative of the rotational orientation of the helmet relative to the aircraft may be readily determined. See U.S. Pat. Nos. 3,983,474 and 4,017,858, both issued to Kuipers and assigned to Polhumus Navigation Sciences, Inc., for further details.

The helmet attitude and position sensing unit 220 need not sense helmet position within the cockpit. The helmet position can be assumed to be fixed with respect to some point within the cockpit, preferably a point generally coinciding with the normal position of the pilot's head. On the other hand, helmet position sensing, if used, provides additional signals which may be used for improving the accuracy of the imagery provided.

The means for entering earth position signals and other data 224 may include, among other things, a keyboard and display for entering various earth position signals and other data. This functional block may also serve as a junction point for routing other data from other sources on a signal line 240 to I/O port 210 via signal line 222.

The image sensing unit 228 may include low visibility image sensing equipment such as forward looking infrared (FLIR) image sensing equipment or other similar devices which might be used when visibility is low. Such devices may include cameras which may in turn require control signals for various purposes including pointing and tracking signals for image acquisition. Some of these control signals may include feedback control signals sent back to the signal processing means 200. In addition, image and control signals will be sent on line 226 from the image sensing unit 228 to the signal processing means 200 for processing and ultimate display on the helmet mounted display system 232 via signal line 230.

Thus, the symbolic imagery provided according to the present invention may be superimposed on either a daylight type, high visibility scene which may be viewed by the pilot through his helmet mounted display system, or may be superimposed on an image of that outside scene not visible to the pilot without the assistance of image sensing equipment 228. In either event, the contact-analog technique as taught herein is generally applicable.

The helmet mounted display system may be of any helmet mounted display system such as any of the types described in the Background Art section It will be understood that the signal processing means 200 of FIG. 2 is shown in generalized form as a general purpose computer which, of course, take on many different forms. For example, and without limitation, the RAM device 204 may in reality be a shared memory such as a dual-port RAM (DPR) for use by a split processor architecture. Such an architecture might have two separate control, address, and data buses 212 instead of the signal one shown. One bus might be dedicated to input/output tasks and communication functions. Such a bus might be responsive to the signals provided by the functional blocks 216, 220, 224 while the other bus might be dedicated to processing image-type signals such as those provided and received on lines 226, 230. Each of the buses would typically have a processor associated therewith such as a Motorola 80286 type processor. If each bus has to communicate with the functional blocks 216, 220, 222 via a MIL-STD-1553 type serial data link then remote terminal interfaces (RTIs) will be needed for interfacing purposes Similarly, each of the buses may need a shared memory interface for interfacing with the DPR for arbitrating access thereto.

If implemented in the manner suggested, the image processing bus might need to be supported by an additional, or third bus, because of the heavy computational load associated with the image processing tasks. For instance, one bus can be dedicated to coordinate transformations and another bus might be dedicated to other image processing algorithms. These second and third image processing buses might also share a memory such as a ping-pong type memory. The third bus might also be responsive to the image sensing unit 228 which might include FLIR. One commercial architecture which has been applied in the graphics generator field is the INRAD II Real Time Graphics systems produced by W. W. Gaertner Research, Inc. Such systems tend to make the use of parallel computer architectures (as opposed to single or dual buses) and provide many graphic functions in firmware or hardware.

Referring now to FIGS. 3–7, a sequence of logical steps are there presented which may be carried out by the signal processing means 200 of FIG. 2.

Figure 3:
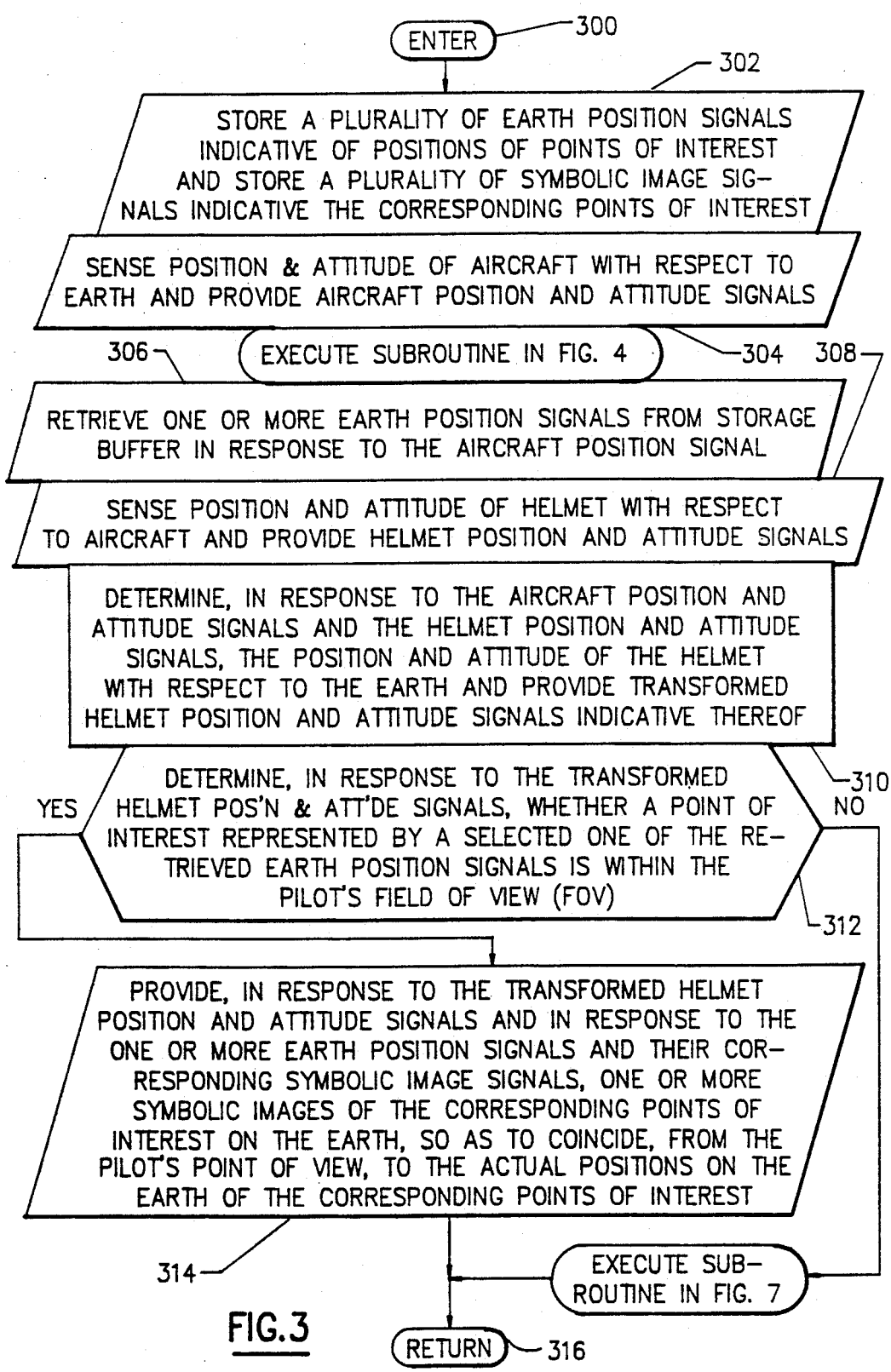
FIG. 3-5 and 7 illustrate a number of logical steps which may be carried out on a signal processing unit such as that illustrated in FIG. 2B, in carrying out the present invention.

Starting with FIG. 3, after entering at a step 300, a step 302 is executed in which a plurality of earth position signals on line 222 of FIG. 2 are stored, e.g., in the RAM unit 204. These signals are indicative of positions of points of interest on the earth such as, without limitation, waypoints. They may be organized in the storage medium according to any convenient scheme by which only those stored earth positions which are determined to be currently within the pilot's field of view may be easily identified and retrieved.

Also, a plurality of symbolic image signals, associated with and graphically indicative of the corresponding points of interest on the earth, may be stored. If a symbolic image is merely a line image, only a pair of end points need be stored. Alternatively, the symbolic images need not be stored but may be generated "on the fly" according to a selected imaging algorithm. The symbolic images may be of the type shown in FIG. 1 and FIG. 2A or may be of any type including noncontact-analog type symbols indicative of aircraft parameters which have no visual relation to the earth.

Figure 4:
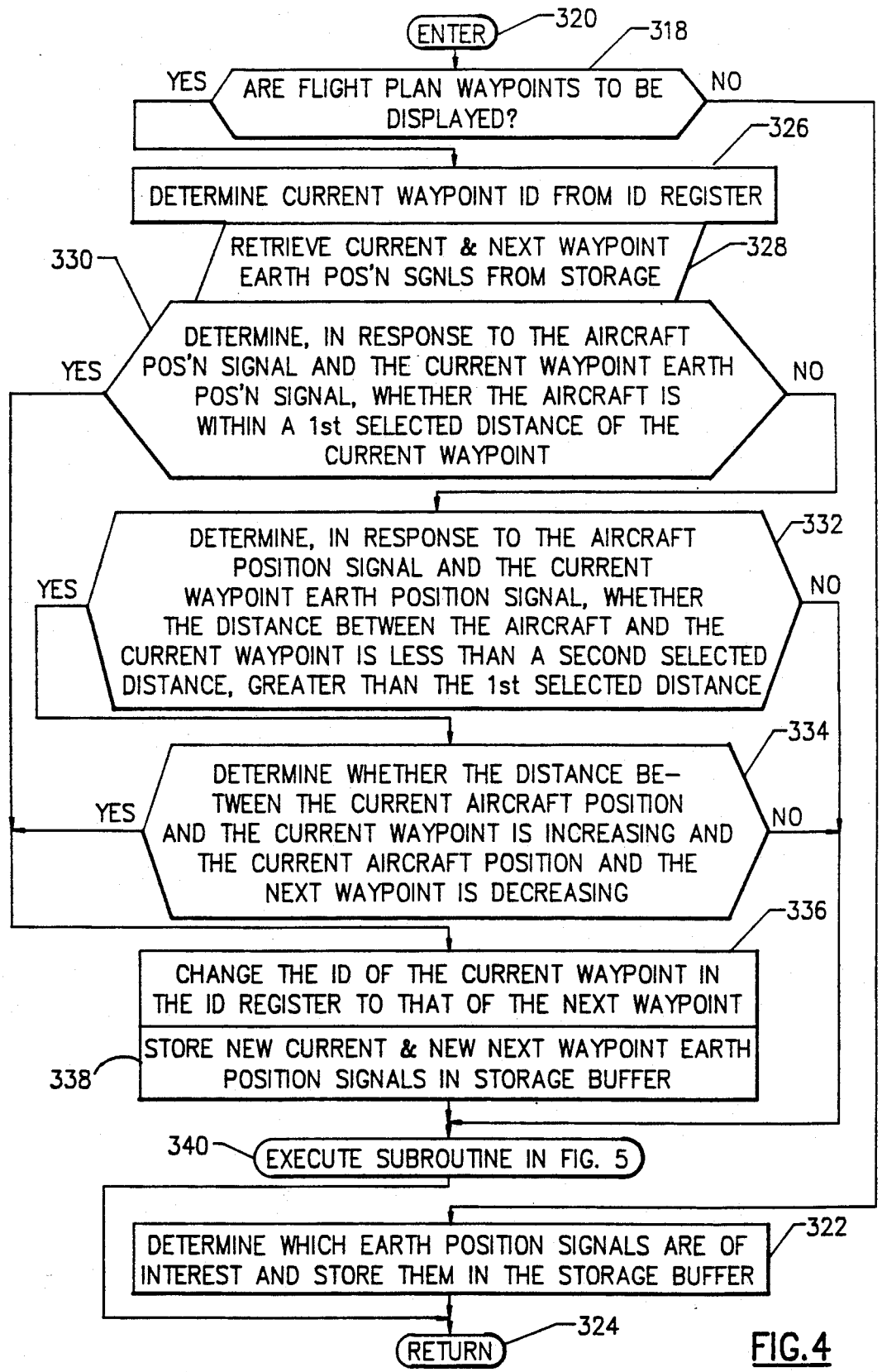

A step 304 is next executed in which the position and attitude of the aircraft with respect to the earth in sensed by the aircraft attitude and position sensing unit 216 of FIG. 2. Aircraft position and attitude signals are provided on line 214 to the signal processing unit 200. A subroutine illustrated in FIG. 4 is then executed to determine which earth position signals are of interest in order that they may be stored in a storage buffer, which may be part of the RAM 204 of FIG. 2. The details of the subroutine of FIG. 4 will be explained in detail subsequently. A step 306 is next executed in which the earth position signals stored in the storage buffer are retrieved. This may be thought of as being in response to the aircraft position signal. However, as shown in FIG. 4, the earth position signals are stored in the storage buffer in response thereto and step 306 can simply be a retrieval of those signals from the storage buffer without reference to the aircraft position signal.

A step 308 is next executed in which the position and attitude of the helmet with respect to the aircraft may be sensed by the sensing unit 220 (illustrated in FIG. 2). (As previously explained, in the alternative, helmet attitude may be the only thing sensed, helmet position being assumed to be fixed in the cockpit). The helmet position and attitude signals are provided on line 218 to the signal processing unit 200.

In response to the aircraft position and attitude signals and in response to the helmet position and attitude signals, the position and attitude of the helmet with respect to the earth is determined and a set of transformed helmet position and attitude signals are provided indicative thereof, as indicated in a step 310.

Figure 7:
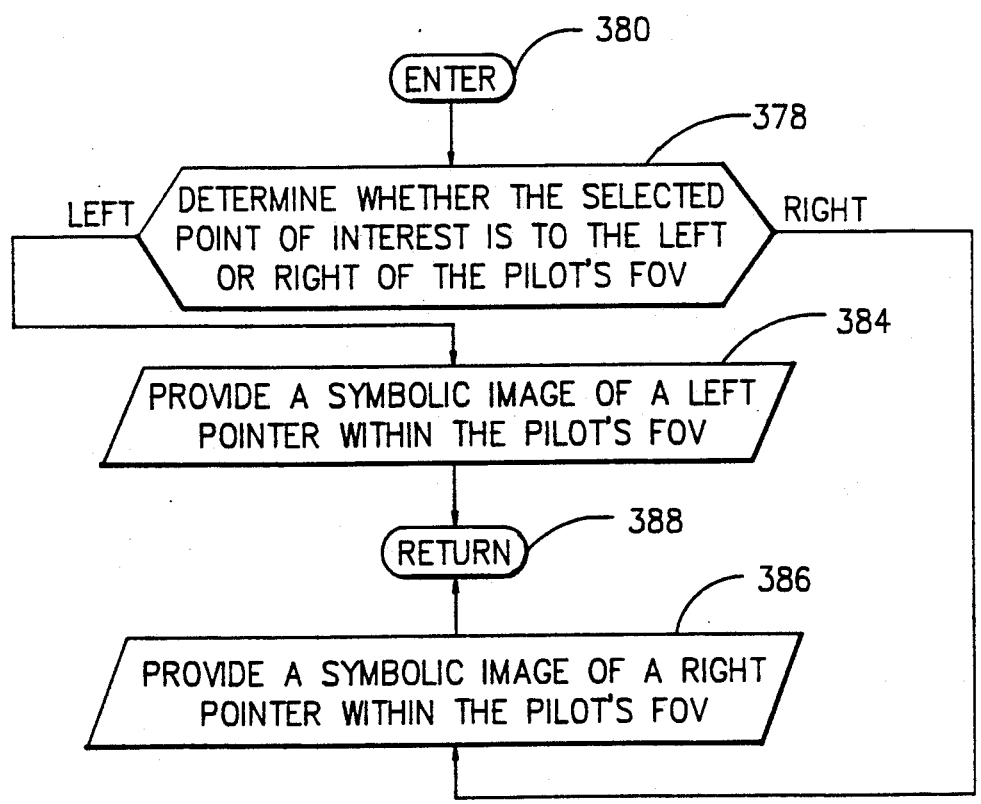

A step 312 is next executed in which a determination is made, in response to the transformed helmet position and attitude signals, whether a point of interest represented by a selected one of the retrieved earth position signals is within the pilot's field of view. If not, a subroutine illustrated in FIG. 7 is next executed, which will be described in detail later. If so, a step 314 is next executed in which one or more symbolic images of the corresponding points of interest on the earth are provided so as to coincide, from the pilot's point of view, to the actual positions on the earth. These images are provided in response to the transformed helmet position and attitude signals and in response to the one or more retrieved earth position signals and their corresponding symbolic image signals. This may be carried out using a contracted shadow mapping technique such as was previously described in connection with FIG. 10. A step 316 is next executed in which a return is made. Depending on the repetition rate of the imagery (assuming, without limitation, a raster scan), the program illustrated in FIG. 3 will be reentered at step 300 within a short period of time, typically in 1/60th or 1/30th of a second.

Referring now to the subroutine illustrated in FIG. 4, which will be executed after executing the step 304 of FIG. 3, a step 318 is next executed after entering in a step 320. There, a determination is made as to whether flight plan waypoints are to be displayed or not. If not, a determination is made in a step 322 as to which earth position signals are of interest for display and they are then stored in the storage buffer. A return is then made in a step 324 so that step 306 of FIG. 3 may be then executed.

Figure 5:
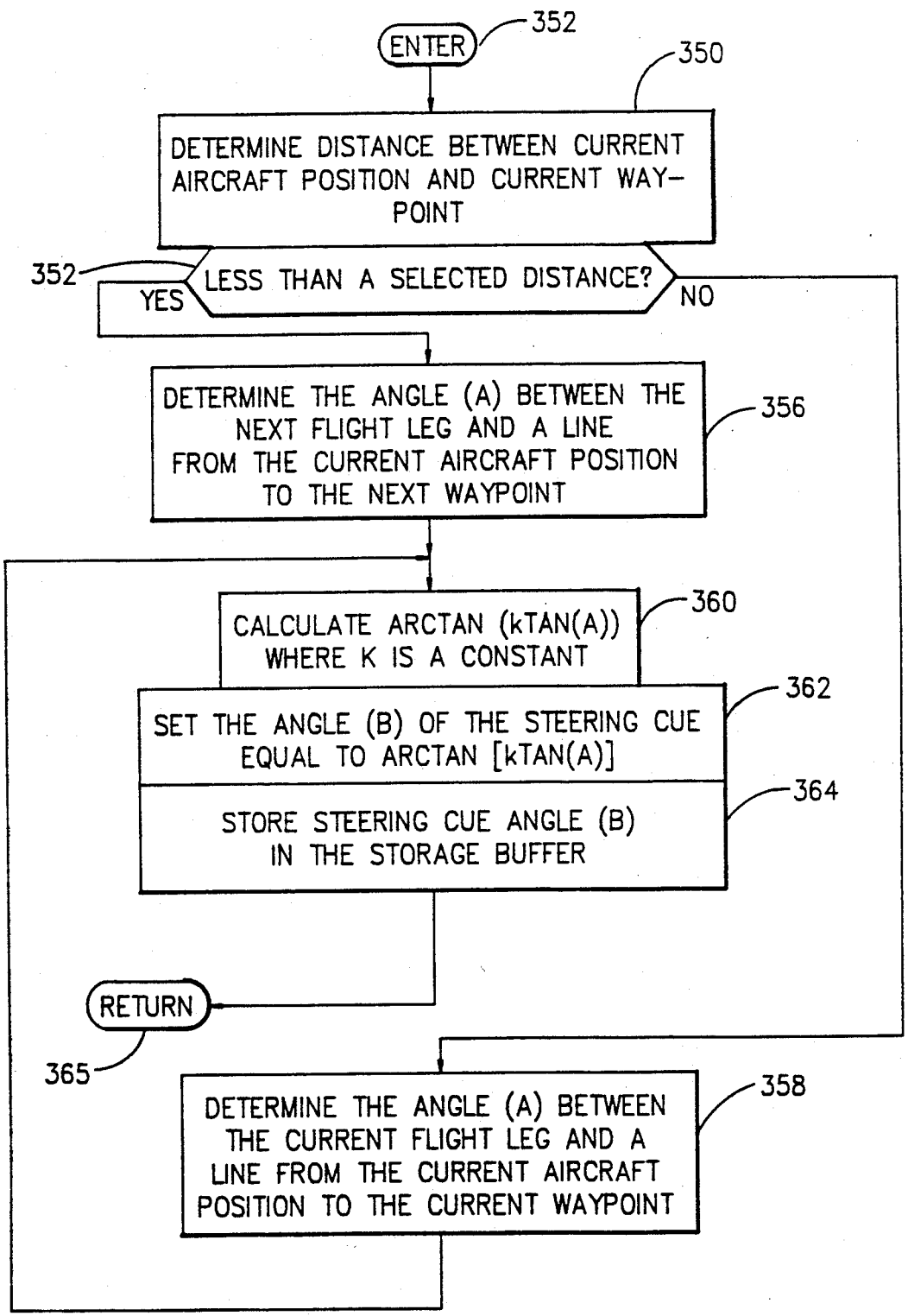
Figure 6:
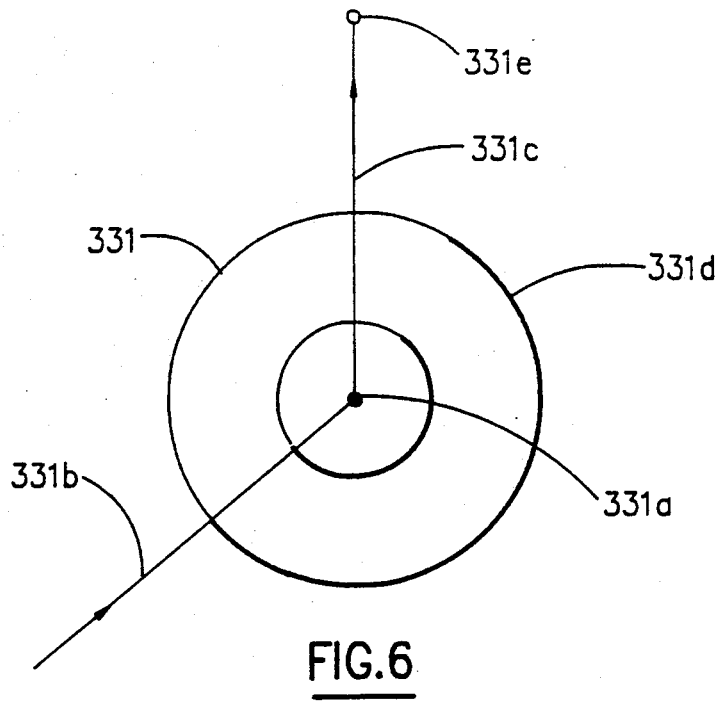
FIG. 6 illustrates part of a typical flight plan showing two circles centered on a current waypoint for use in determining, according to the present invention, when the identity of the current waypoint should be changed to the next waypoint.

If a determination is made in step 318 of FIG. 4 that waypoints are to be displayed, a determination is made in a step 326 as to the current waypoint identification which may be made by checking with an identification register set up to keep track of the current waypoint's identity. Once this is determined, the current and next waypoint earth position signals may be retrieved from storage, as indicated in a step 328. A determination is then made, as shown in a step 330, in response to the aircraft position signal and the current waypoint earth position signal, whether the aircraft is within a first selected distance of the current waypoint. Such a first selected distance is illustrated by a circle 331 in FIG. 6, centered on a current waypoint 331a at the end of a current flight leg 331b and the beginning of a next flight leg 331c. If not, a determination is made in a step 332 as to whether the distance between the aircraft and the current waypoint is less than a second selected distance 331d, greater in magnitude than the first selected distance 331. This is also done in response to the aircraft position signal and the current waypoint earth position signal If the distance to the current waypoint 331a is determined to be less than the second selected distance 331d, a step 334 is next executed in which a determination is made as to whether both the distance between the aircraft and the current waypoint is increasing and the distance between the aircraft and a next waypoint 331e is decreasing. If so, the identity of the current waypoint 331a is changed in the identification register to that of the next waypoint 331e, as indicated in a step 336. Step 336 would have been executed directly if it had been determined in step 330 that the aircraft was within the first selected distance 331 of the current waypoint A step 338 is next executed in which the new current and new next waypoint earth position signals are stored in the storage buffer. A subroutine illustrated in FIG. 5 is next executed as indicated in a step 340. Step 340 would have been executed directly if it had been determined in step 332 that the distance between the aircraft and the current waypoint 331a was less than the second selected distance 331d or, if a determination had been made in step 334 that either the distance between the aircraft and the current waypoint 331a were not increasing or the distance between the aircraft and the next waypoint 331e were not decreasing.

The subroutine of FIG. 5 relates to the steering cue and will be described in detail below. After executing the subroutine of FIG. 5, a return is made in step 324 so that step 306 of FIG. 3 may be executed and the desired symbolic images may be provided to the eye or eyes of the pilot.

Referring now to FIG. 5, a step 350 is first executed after entering in a step 352 in which a determination is made as to the distance between the current aircraft position and the current waypoint A determination is then made in a step 352 as to whether the distance to the current waypoint is more than a selected distance, i.e., whether the steering cue should be provided for him to follow with respect to the current or next flight leg. It is advantageous to provide a smooth "corner-turning"

steering cue with respect to the next flight leg just before arriving at the current waypoint so the "corner" may be turned in a smooth manner. If it is determined that he is within the selected distance of the current waypoint, a step 356 is next executed in order to determine the angle (A) between the next flight leg and a line from the current aircraft position to the next waypoint. If it is determined in step 352 that the aircraft is not close enough to the current waypoint to commence cornering, a determination is made in a step 358 of the angle (A) between the current flight leg and a line from the current aircraft position to the current waypoint. In either event, the arctangent of K·TAN(A), where K is a constant, is then calculated in order to determine the value of the angle B which measures the angle between the current flight leg 46 and the line 50 between the present aircraft position 44 and the desired position of the steering cue at the present moment in order to steer the pilot back to the flight plan in a smooth manner. This is done in a step 362. The steering cue angle (B) is then stored in the storage buffer, as indicated in a step 364, and a step 365 is executed, in which a return is made to step 340 of FIG. 4 which in turn returns, via step 324, to the steps of FIG. 3 so that step 306 may be next executed.

If it were determined in step 312 of FIG. 3 that the point of interest to be displayed is not within the pilot's field of view the subroutine illustrated in FIG. 7 is executed and will now be described in detail.

Referring now to FIG. 7, a step 378 is first executed after entering in a step 380 in which a determination is made as to whether the selected point of interest is to the left or right of the pilot's field of view. If left, a symbolic image of a left pointer 382 (see FIG. 1) is provided within the pilot's field of view, as indicated in a step 384. If to the right, a symbolic image of a right pointer is provided within the pilot's field of view, as indicated in a step 386. In either event, a return is then made in a step 388 so that the return step 316 of FIG. 3 may then be executed. The symbolic left pointer 382 of FIG. 1 indicates to the pilot that he must turn his head or aircraft to the left in order to view the current waypoint 32. The pointer may take the form of a carat and may be used in connection with the steering cue described previously. Thus, it may take the form of the carat-shaped symbol 42b of FIG. 1 (which shows in phantom where it would appear if the pilot turned his head in that direction) which moves horizontally just below the compass heading symbol which the pilot can follow in order to stay on or get back on the current flight leg. The carat symbol may, for example, have 3 possible orientations: if the direction-to-steer is within plus or minus a selected number of degrees (e.g., 19 degrees) of the vertical centerline of the pilot's field of view, then the carat points upward, as shown in FIGS. 2A (solid) and 1 (phantom); if the direction-to-steer is beyond plus or minus the selected range then the carat will rotate to either point left or right to cue the pilot which way to turn to bring the carat within the selected range.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. A method for providing, within a helmet, symbolic images to a pilot in an aircraft, comprising the steps of:
   sensing the position and attitude of the aircraft with respect to the earth and providing an aircraft position signal and an aircraft attitude signal respectively indicative thereof;
   sensing the attitude of the helmet with respect to the aircraft and providing a helmet attitude signal indicative thereof;
   determining, in response to said aircraft position signal, said aircraft attitude signal and said helmet attitude signal, the position and attitude of the helmet with respect to the each and respectively providing a helmet position signal and a transformed helmet attitude signal indicative thereof;
   storing a plurality of earth position signals indicative of a sequence of waypoint position signals indicative of the positions of waypoints in a selected flight path with respect to the earth;
   retrieving from storage, in response to said aircraft position signal, a current waypoint position signal indicative of the position of the current waypoint in the flight path;
   determining, in response to said helmet position and transformed helmet attitude signals and said current waypoint position signal, the position of said current waypoint with respect to the helmet and providing a helmet-oriented current waypoint position signal indicative thereof;
   ascertaining, in response to said helmet-oriented current waypoint position signal and said transformed helmet attitude signal, whether the position of the current waypoint is within the pilot's field of view and, if so,
   retrieving from storage, one or more symbolic image signals corresponding to said retrieved current waypoint position signal;
   providing, in response to said helmet-oriented current waypoint position signal and said retrieved symbolic image signals, one or more symbolic images indicative of said current waypoint so as to coincide, from the point of view of the pilot, with the actual position of the current waypoint on the earth; and
   wherein if it were determined in said ascertaining step that the position of the current waypoint is not within the pilot's field of view, performing the further step of providing an image of a symbol indicative of the direction in which the pilot's head or aircraft may be turned in order to bring a symbolic image of the current waypoint within the pilot's field of view.

2. A method for providing, within a helmet, symbolic images to a pilot in an aircraft, comprising the steps of:
   sensing the position and attitude of the aircraft with respect to the earth and providing an aircraft position signal and an aircraft attitude signal respectively indicative thereof;
   sensing the attitude of the helmet with respect to the aircraft and providing a helmet attitude signal indicative thereof;
   determining, in response to said aircraft position signal, said aircraft attitude signal and said helmet attitude signal, the position and attitude of the helmet with respect to the earth and respectively providing a helmet position signal and a transformed helmet attitude signal indicative thereof;

storing a plurality of earth position signal indicative of a sequence of waypoint position signals indicative of the positions of waypoints in a selected flight path with respect to the earth;

retrieving from storage, in response to said aircraft position signal, a current waypoint position signal indicative of the position of the current waypoint in the flight path;

determining, in response to said helmet position and transformed helmet attitude signals and said current waypoint position signal, the position of said current waypoint with respect to the helmet and providing a helmet-oriented current waypoint position signal indicative thereof;

ascertaining, in response to said helmet-oriented current waypoint position signal and said transformed helmet attitude signal, whether the position of the current waypoint is within the pilot's field of view and, if so, retrieving from storage, one or more symbolic image signals corresponding to said retrieved current waypoint position signal;

providing, in response to said helmet-oriented current waypoint position signal and said retrieved symbolic image signals, one or more symbolic images indicative of said current waypoint so as to coincide, from the point of view of the pilot, with the actual position of the current waypoint on the earth; and wherein said step of retrieving a current waypoint position signal comprises the steps of:

retrieving a first waypoint position signal from said stored sequence of waypoint position signals and identifying said first retrieved signal as said current waypoint position signal;

retrieving a second waypoint position signal stored sequentially after said first waypoint position signal and identifying said second retrieved signal as a next waypoint position signal indicative of the position of the next waypoint in said selected flight path after said current waypoint;

determining, in response to said helmet position signal and said current waypoint position signal, whether the distance between the helmet and the current waypoint is less than a first selected distance and, if so, identifying said second retrieved waypoint position signal as indicative of the current waypoint and, if not, determining, in response to said helmet position signal and said next waypoint position signal, whether the distance between the helmet and the current waypoint is less than a second selected distance (which is greater than said first selected distance) and, if so, determining whether both the distance between the current aircraft position and the current waypoint is increasing and the distance between the current aircraft position and the next waypoint is decreasing and, if both are so, identifying said second retrieved waypoint position signal as indicative of the current waypoint.

3. A method for providing, within a helmet, symbolic images to a pilot in an aircraft, comprising the steps of:

sensing the position and attitude of the aircraft with respect to the earth and providing an aircraft position signal and an aircraft attitude signal respectively indicative thereof;

sensing the attitude of the helmet with respect to the aircraft and providing a helmet attitude signal indicative thereof;

determining, in response to said aircraft position signal, said aircraft attitude signal and said helmet attitude signal, the position and attitude of the helmet with respect to the earth and respectively providing a helmet position signal and a transformed helmet attitude signal indicative thereof;

storing a plurality of earth position signals indicative of a sequence of waypoint position signals indicative of the positions of waypoints in a selected flight path with respect to the earth;

retrieving from storage, in response to said aircraft position signal, a current waypoint position signal indicative of the position of the current waypoint in the flight path;

determining, in response to said helmet position and transformed helmet attitude signals and said current waypoint position signal, the position of said current waypoint with respect to the helmet and providing a helmet-oriented current waypoint position signal indicative thereof;

ascertaining, in response to said helmet-oriented current waypoint position signal and said transformed helmet attitude signal, whether the position of the current waypoint is within the pilot's field of view and, is so, retrieving from storage, one or more symbolic image signals corresponding to said retrieved current waypoint position signal;

providing, in response to said helmet-oriented current waypoint position signal and said retrieved symbolic image signals, one or more symbolic images indicative of said current waypoint so as to coincide, from the point of view of the pilot, with the actual position of the current waypoint on the earth; and wherein said step of retrieving a current waypoint position signal also retrieves a last waypoint position signal stored just preceding said current waypoint position signal and a next waypoint position signal stored just subsequent to said current waypoint position signal, and further comprising the steps of:

determining, in response to said aircraft position signal and said last waypoint position signal and said current waypoint position signal, an angle (A) between a line from the current aircraft position to the current waypoint and a current flight leg line from the last waypoint to the current waypoint, and providing a first angle signal having a magnitude indicative of the magnitude of angle (A);

determining, in response to said first angle signal, an angle (B) equal to the arctangent of a constant (K) times the tangent of angle A and providing a second angle signal having a magnitude indicative of the magnitude of angle (B); and wherein said step of providing one or more stored symbolic images further comprises the step of providing an image of a steering cue offset from said image of said current waypoint by an angle defined by the relation $\{180-[(180-B)+A]\}$ between a line from said current aircraft position to said current waypoint and a line intersecting said current aircraft position and said current flight leg line.

* * * * *

UNITED STATES PATENT AND TRADEMARK OFFICE
CERTIFICATE OF CORRECTION

PATENT NO. : 5,072,218
DATED : December 10, 1991
INVENTOR(S) : R.E. Spero, et al It is certified that error appears in the above-indentified patent and that said Letters Patent is hereby corrected as shown below:

Column 5, line 62 after "provided" insert --.--
Column 8, line 16 after "aircraft" insert --.--
Column 24, line 13 change "each" to --earth--
Column 26, line 28 change "is" to --if--

Signed and Sealed this

Eighth Day of June, 1993

Attest:

MICHAEL K. KIRK

Attesting Officer     Acting Commissioner of Patents and Trademarks